United States Patent [19]
Barry et al.

[11] Patent Number: 6,014,131
[45] Date of Patent: Jan. 11, 2000

[54] INTERACTIVE PROGRAMMABLE INTERFACE FOR RELEGENDABLE LCD KEYSWITCHES

[75] Inventors: James Anthony Barry, Dublin; William Peter Roger Bannon, Glenageary; John Caldwell, Killiney, all of Ireland

[73] Assignee: Feltscope Limited, Dublin, Ireland

[21] Appl. No.: 08/637,769

[22] PCT Filed: Nov. 7, 1994

[86] PCT No.: PCT/IE94/00052

§ 371 Date: Jun. 10, 1996

§ 102(e) Date: Jun. 10, 1996

[87] PCT Pub. No.: WO95/12843

PCT Pub. Date: May 11, 1995

[30] Foreign Application Priority Data

Nov. 5, 1993 [IE] Ireland .................................... S930854

[51] Int. Cl.[7] ........................................ G09G 5/00
[52] U.S. Cl. .......................... 345/172; 345/168; 341/23; 341/28
[58] Field of Search ..................... 345/168, 170, 345/169, 171, 172; 340/20, 22, 23, 28

[56] References Cited

U.S. PATENT DOCUMENTS

| | | | |
|---|---|---|---|
| 4,853,888 | 8/1989 | Lata et al. | 341/23 |
| 5,128,672 | 7/1992 | Kaehler | 341/23 |
| 5,181,029 | 1/1993 | Kim | 341/22 |
| 5,233,167 | 8/1993 | Markman et al. | 235/375 |

FOREIGN PATENT DOCUMENTS

| | | |
|---|---|---|
| 510194 A1 | 10/1992 | Germany . |
| 221698 A2 | 5/1987 | United Kingdom . |
| 226392 A2 | 6/1987 | United Kingdom . |
| 474360 A3 | 7/1993 | United Kingdom . |
| WO 85/01596 | 4/1985 | WIPO . |
| WO 95/12843 | 5/1995 | WIPO . |

OTHER PUBLICATIONS

IBM Tech. Discl. Bulletin, Feb. 1984.
IBM Tech Discl. Bulletin, Jan. 1987.

*Primary Examiner*—Jeffery A. Hopsass
*Assistant Examiner*—Julie B. Lieu
*Attorney, Agent, or Firm*—Hoffmann & Baron, LLP

[57] ABSTRACT

An interface circuit for interfacing a relegendable liquid crystal display (LCD) keyswitch to a controlling processor. The interface circuit is adaptable for use with data input devices and point-of-sale devices.

32 Claims, 33 Drawing Sheets

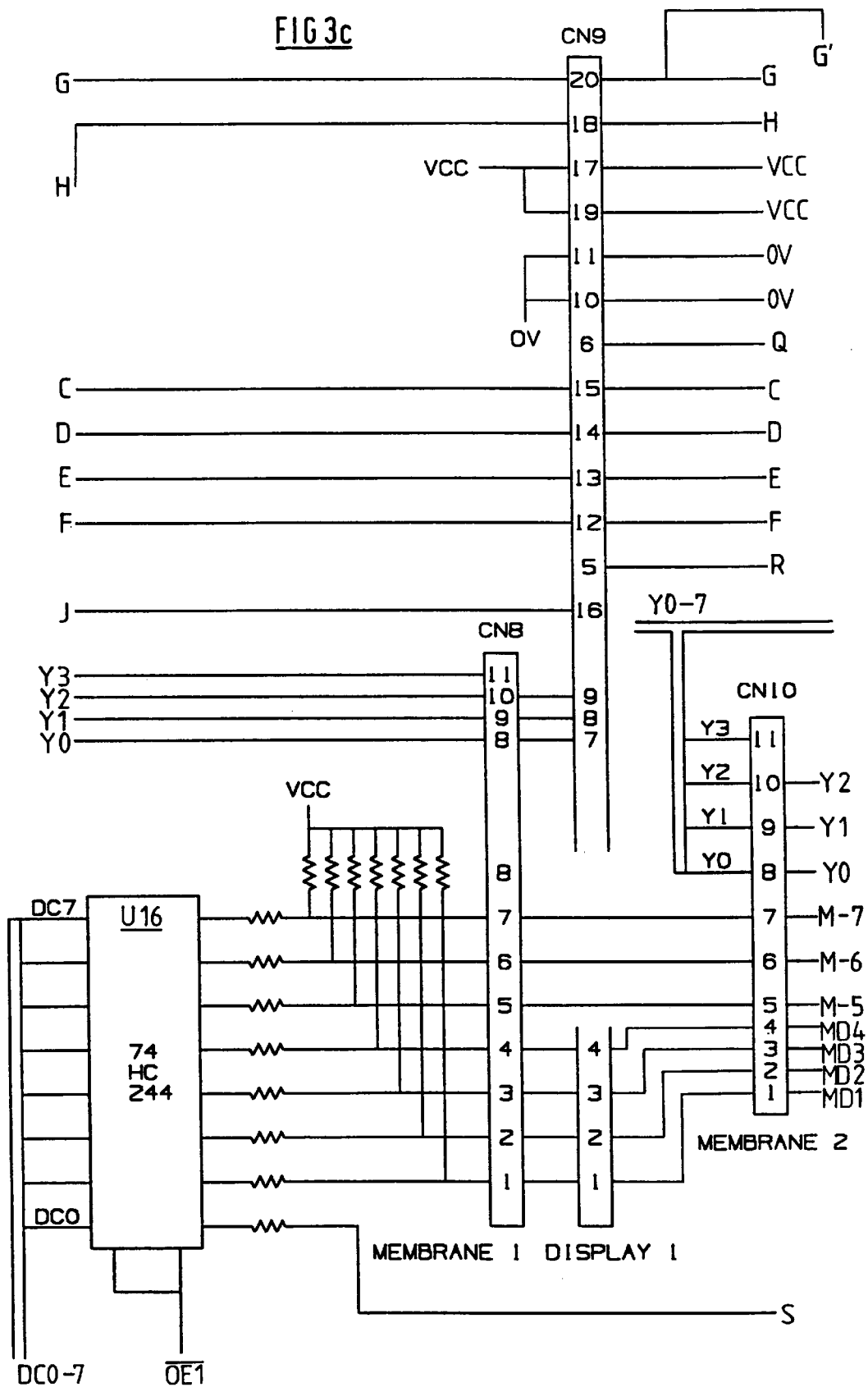

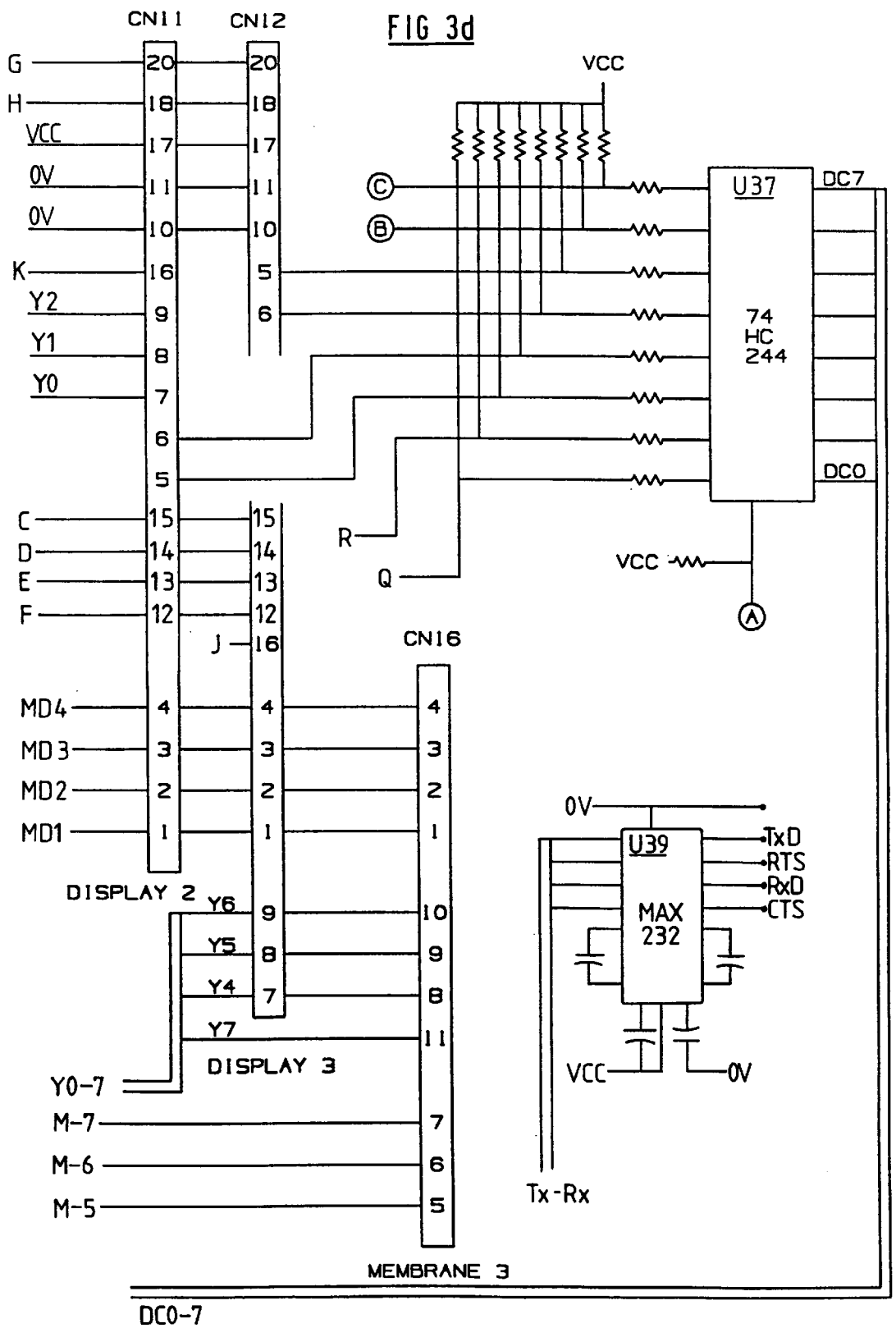

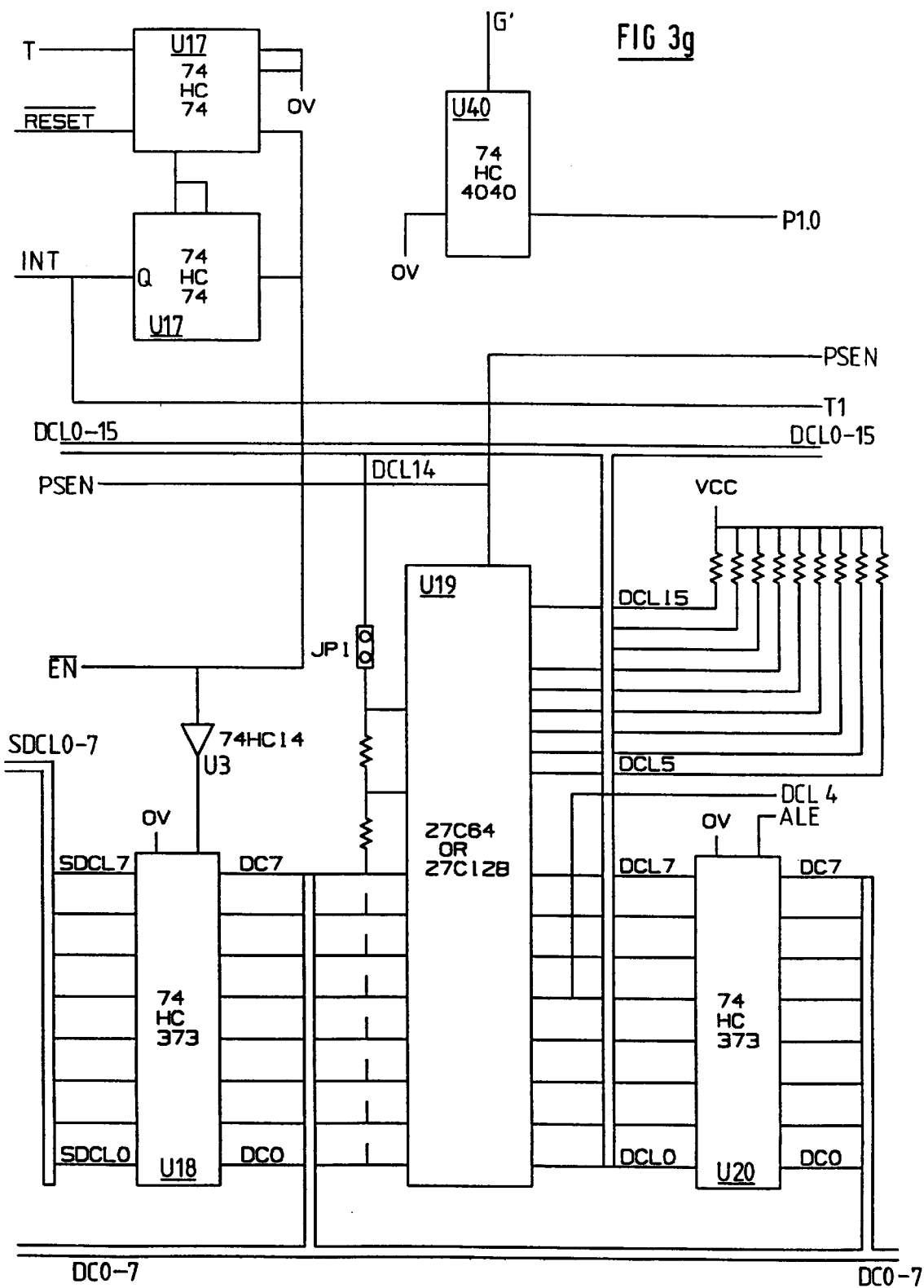

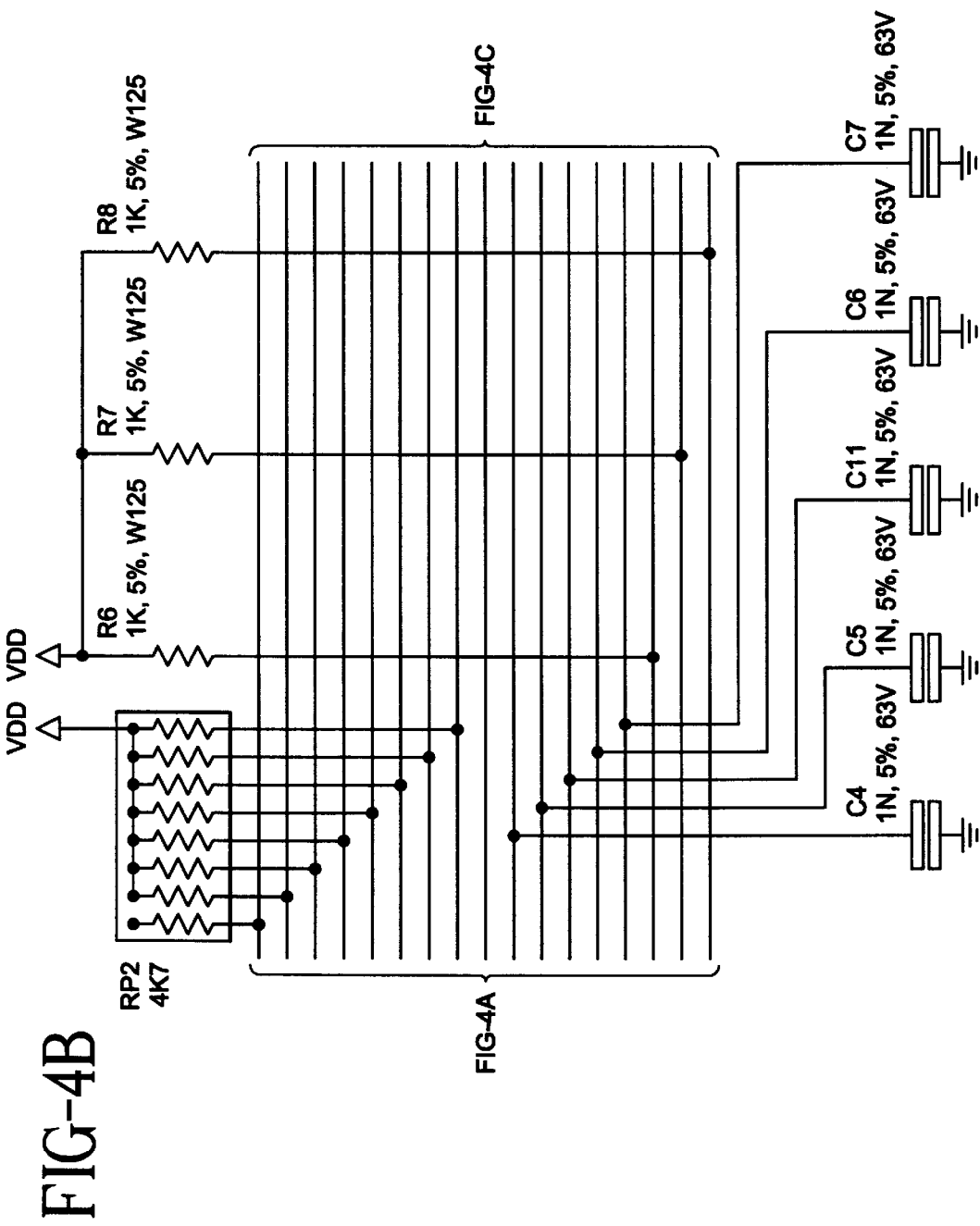

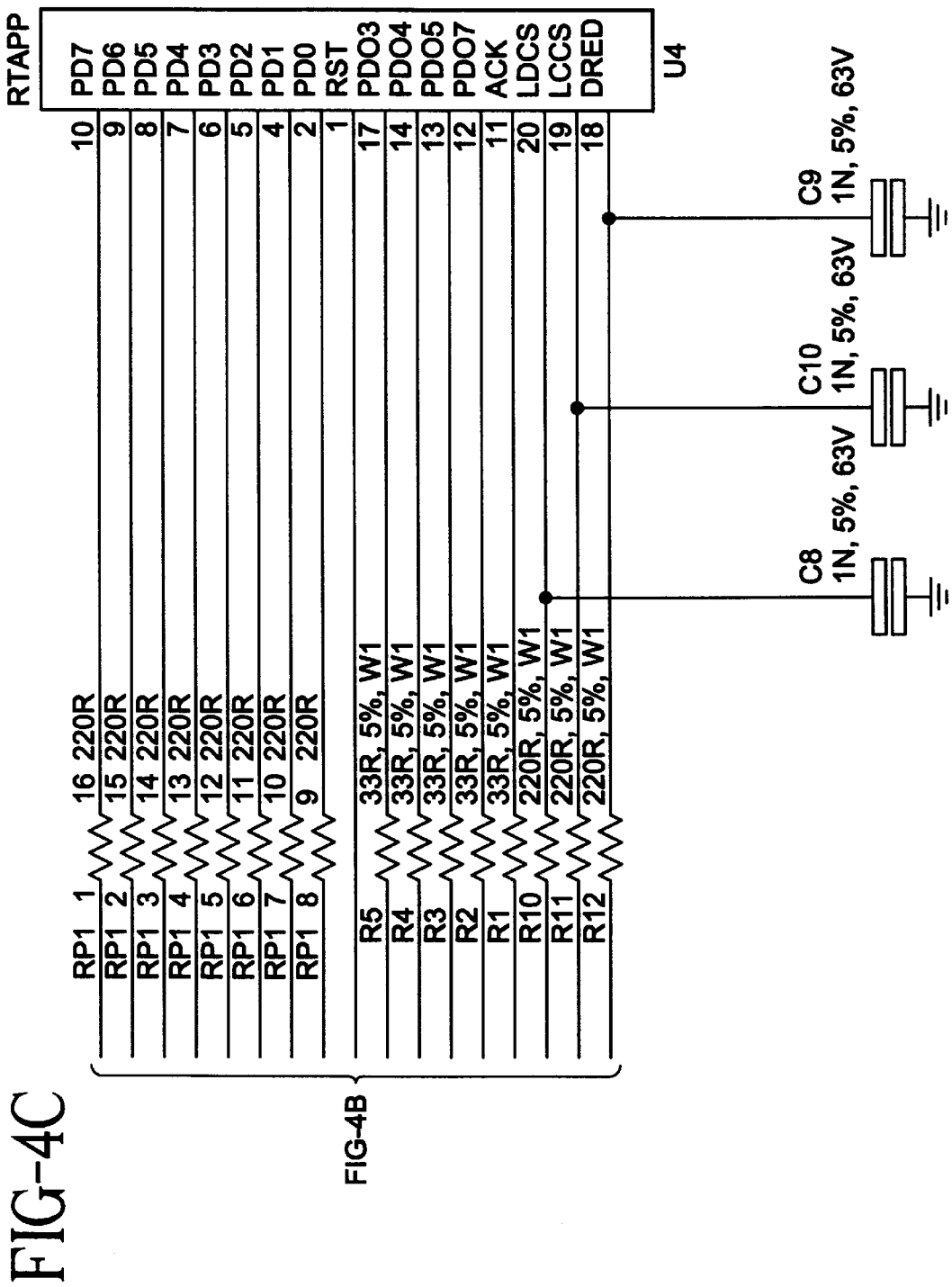

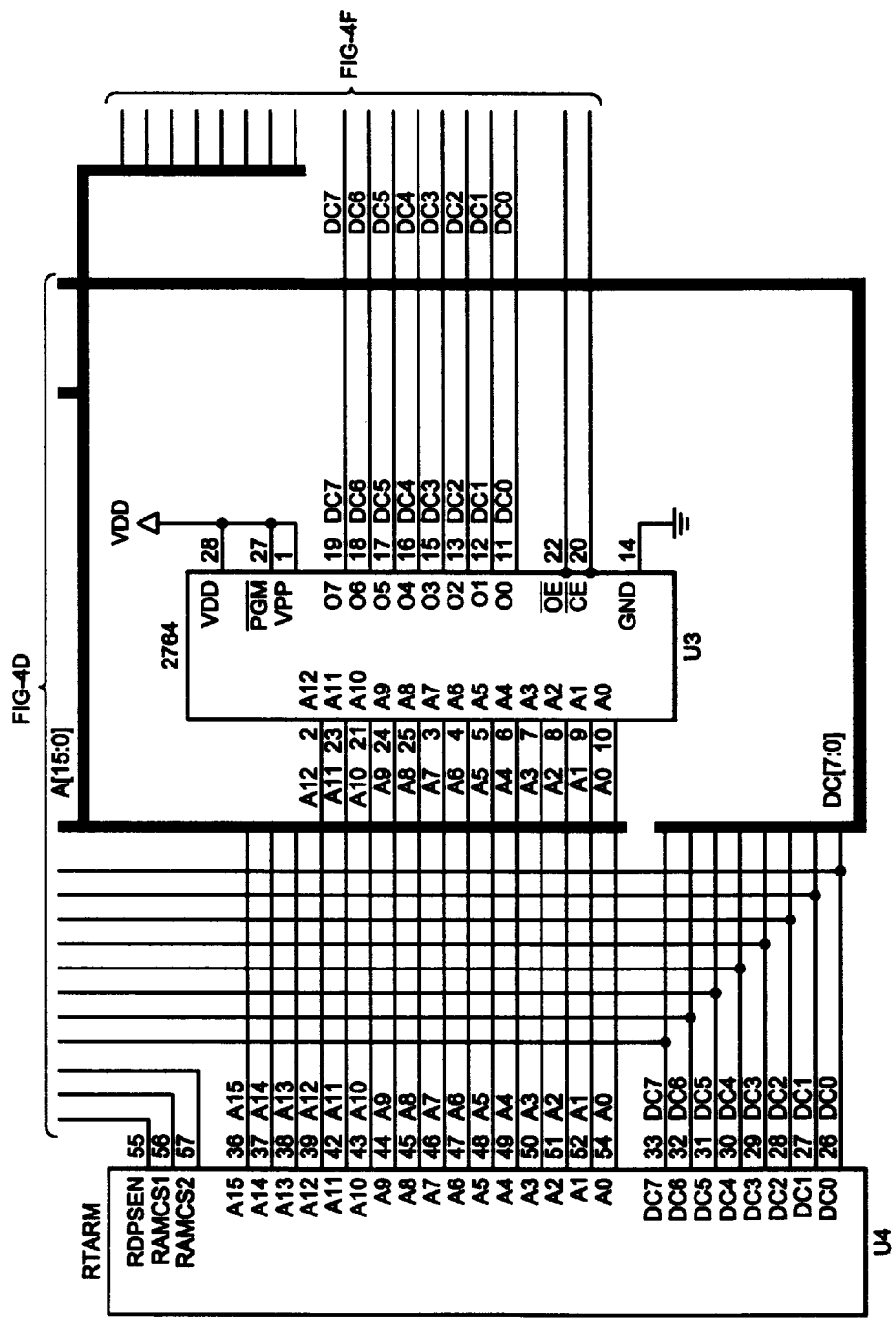

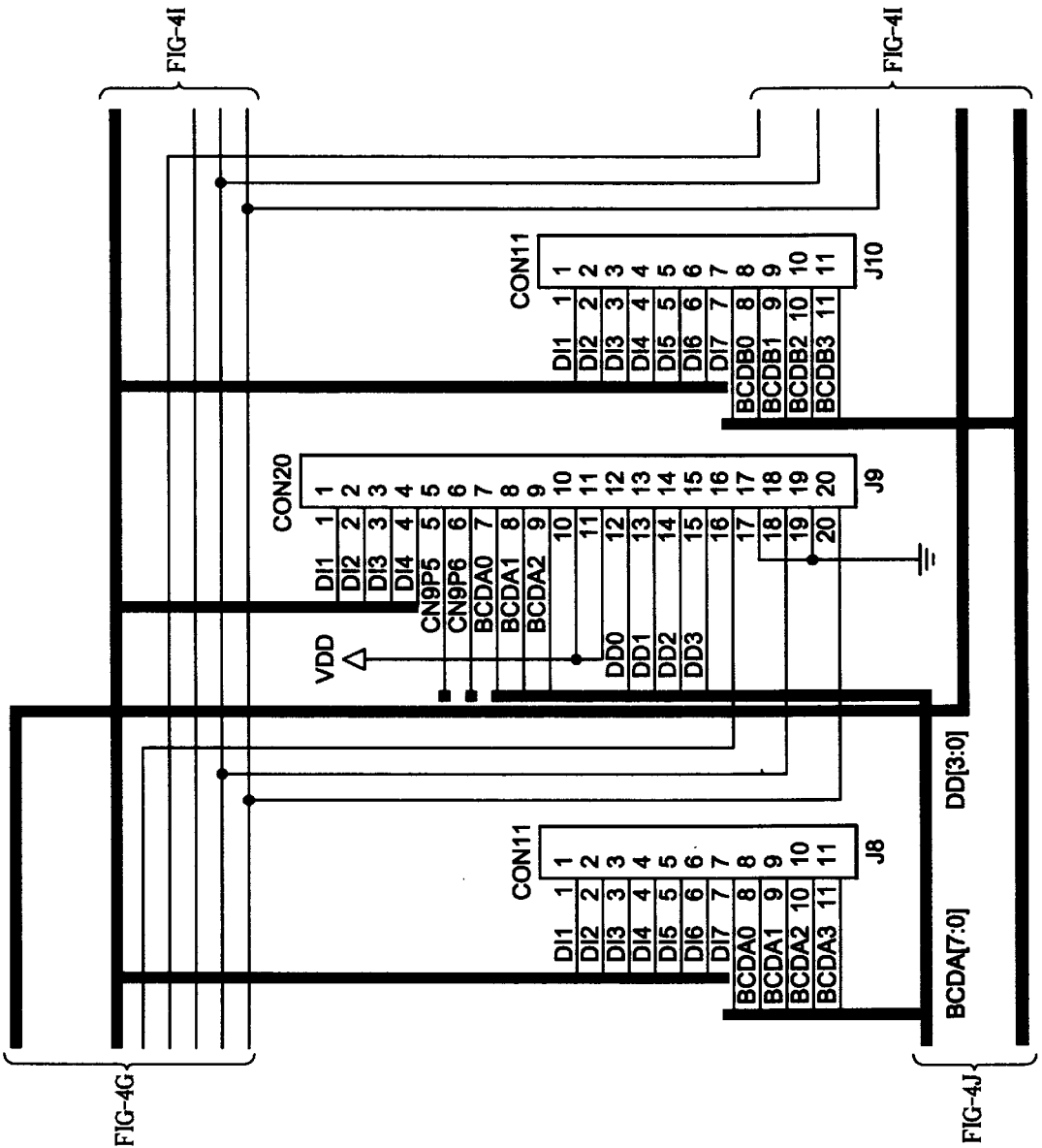

INTERACTIVE PROGRAMMABLE INTERFACE FOR RELEGENDABLE LCD KEYSWITCHES

BACKGROUND OF THE INVENTION

The present invention relates to interactive programmable interfaces for liquid crystal display (LCD) keyswitches and in particular to an on-line interactive programmable interface between a high speed data port of a computer and LCD keyswitch devices. The invention also relates to input/output devices having relegendable LCD keyswitches for use as stand-alone devices having an on-board microprocessor and for use in conjunction with a computer.

International Patent Publication No. WO 85/01596 discloses tactile function keys comprising relegendable keyswitches to provide a set of self-identifying function keys which can interface with any computer or dumb terminal. It was contemplated in this publication that each of the function keys should be independently programmable. However, the emphasis was placed throughout the publication on providing a keyset and at least one data set corresponding to the keys in the keyset. To alter the data displayed on the relegendable keyswitches, the data set is strobed to the keys in the keyset. Particular data for a display is stored in a corresponding memory location so that when a refresh or strobe signal is received the data from each memory location applicable to a keyset is transferred to the keyswitch displays.

WO 85/01596 also discloses relegendable keyswitches formed into a peripheral keypad which is interfaced to a computer using an interface circuit which functions as described above. A modified keyboard having a strip of relegendable keyswitches is also disclosed. Data set transfer is conducted via the standard keyboard interface.

Similarly, EP-A-0 226 392 relates to a display key comprising a relegendable keyswitch and a keyboard formed of such keyswitches. Display commands indicative of information to be displayed on the displays of the keys are assigned to memory locations which are accessed sequentially to transfer the display commands (data) to the key displays. Again, the emphasis in this publication is placed on an entire keyset being changed, for example, from upper case letters to lower case letters by the operation of the "shift" key or from a conventional QWERTY keyboard layout to some other array or language alphabet. The entire keyboard of a typewriter could be shifted from Roman to Greek to Japanese characters or to any other character set by an appropriate instruction. A further example includes an application program that is menu driven which is arranged to display the possible menu selections on the keys themselves. Thus, at different times a key can be used to cause the key displays to change. In each case, an entire new keyset is downloaded from memory to the displays.

EP-A-0 221 698 also discloses a display key comprising a relegendable keyswitch. The displays are LCDs (liquid crystal displays) made up of a matrix of sixteen rows and twenty four columns. Each dot or pixel in the matrix is assigned a location in the memory associated with the display driver circuitry of each key. In all embodiments described in this publication the "refreshing" and resetting of the displays is performed collectively, for example, the reset code for all displays is performed through a dedicated conductor common to all the display drivers.

As demonstrated in the aforementioned publications, it was believed that data sets should be altered in their entirety rather than individual keyswitch display data locations being addressed and altered. Discrete data cannot be transferred using the interface architecture disclosed in these publications.

Data input devices and more particularly point-of-sale devices are discussed in US-A-5,233,167. The publication discloses a point-of-sale device for use in a retail goods or services facility and is configured as a multi-function terminal having a built-in microprocessor. A keyboard for data entry is arranged in key blocks relating to particular attributes of the goods or services. The keyboard can be programmed for different attributes for different key block designations. A particular designation can be changed visually by substituting a replaceable overlay on the keyboard. To alter the designations of the key blocks, a host computer must reinterpret the code generated when a key is pressed. Once any designation has been changed the appropriate overlay must be sought and placed on the keyboard. This arrangement is suitable only in limited applications, for example, a shop dealing in a very limited range of goods or providing a service of limited scope. No interactivity between the controlling processor (a host computer) and the keyboard designations is illustrated.

IBM Technical Disclosure Bulletin, Vol. 29, No. 8, January 1987, New York, U.S., page 3636 discloses a mouse button layout employing full function keys.

IBM Technical Disclosure Bulletin, Vol. 26, No. 9, February 1984, New York, U.S., pages 4582-4583 discloses a keyboard with optically changeable key symbols.

The present invention discloses interfacing means developed to provide an on-line, interactive and real-time interface using the standard parallel port of a personal computer (PC) as the connection port to LCD devices comprising keyswitches grouped to form a keyboard or keypad. The keyboard or keypad can be formed by using LCD keyswitches only or a combination of LCD keyswitches and traditional keyswitches. The keyboard or keypad can be configured either as an integral part of a machine or as an attachable unit in either a fixed or mobile application. Further disclosed are data input/output devices operational remotely of a computer, having an on-board microprocessor in communication with the keyswitches via the interfacing means of the invention. The invention relates to the interfacing means which include hardware circuitry designs, firmware and software either as individual components or as a combination. The LCD keyswitches are programmable at picture element (pixel) level which allows data to be displayed either alpha-numerically, in graphic form or as static or moving pictograms. The keyswitches allow a range of backlit hues to be programmed. The LCD keyswitches exist in the prior art as exemplified by GB-A-2 150 722 (Muller) or EP-A-0 232 137 (Dowty Electronic Components Limited) and are not the subject of this invention.

This invention specifically covers the interfacing between computers and LCD keyswitches of the prior art which allows applications programs running on a computer such as a PC to communicate in an immediate, on-line and interactive way with a matrix of keyswitches to display alpha-numeric, graphic or pictogram information with or without backlit colour. The invention also covers devices using such an interface and remote devices capable of running programs from memory and adaptable for connection to a computer.

It is thus an object of the present invention to provide an improved programmable interface circuit for relegendable LCD keyswitches and to provide data input and point-of-sale devices exhibiting high-speed, on-line interactivity between the LCD keyswitches and a controlling processor.

According, the present invention provides an interface circuit for interfacing a matrix of relegendable liquid crystal display (LCD) keyswitches to a controlling processor, the circuit comprising:

means for addressing each LCD keyswitch;

means for transferring display data to each LCD keyswitch; and means for reading data from each LCD keyswitch for transferring data representative of a desired function of a keyswitch from the controlling processor to the interface circuit for display on the LCD keyswitch so that, when that keyswitch is activated, the keyswitch is read by the circuit which allows the controlling processor to execute the indicated function represented on the display of the LCD keyswitch, characterised in that each LCD keyswitch is individually addressable and separately relegendable so that high speed, on-line interaction between each LCD keyswitch and the controlling processor is facilitated for substantially immediate relegending or refreshing of the display on each LCD keyswitch.

The circuit further comprises:

means for establishing the current function of each keyswitch within a matrix;

means for transmitting data to the relegendable LCD to display an alpha-numerical, graphical or pictogram image representative of the current or desired keyswitch function; and means for providing a signal to the controlling processor to enact the function represented on the LCD keyswitch when the keyswitch is activated.

The circuit further comprises:

means for displaying on each LCD keyswitch an image representative of the data to be introduced or command to be executed;

means for selecting or enabling each keyswitch;

means for reading or sensing when each keyswitch is activated;

means for transmitting the data or command to the controlling processor; and means for individually and separately altering the representative image on the display and the data to be introduced or command to be executed by a LCD keyswitch when the keyswitch is activated.

Advantageously, at least one LCD keyswitch within the matrix is assigned a macro comprising a plurality of functions executable by a single keystroke of the keyswitch.

The interface circuit may also include memory circuits for holding default instructions or initialisation commands and start-up data and for storing program instructions and/or data representative of the images for display on each LCD keyswitch.

Advantageously, Read Only Memory (ROM) is provided on the circuit to hold default instructions or initialisation commands for the LCD keyswitches and in which Random Access Memory (RAM) is provided on the circuit for storing data representative of the images used for a particular application or program operating on the controlling processor.

In a preferred arrangement, the RAM is preloaded with application or program instructions so that a central processor unit (CPU) in the interface circuit is independent of the controlling processor.

The controlling processor may comprise a computer in communication with the interface circuit via the parallel port of the computer.

Optionally, the controlling processor comprises an on-board microprocessor in direct communication with an interface circuit CPU.

The present invention further provides a data input device comprising a matrix of relegendable LCD keyswitches and an interface circuit for interfacing the device with a controlling processor, the keyswitches comprising LCDs for displaying an image representative of the keyswitch function characterised in that each keyswitch in the matrix is individually addressable and separately relegendable so that high speed, on-line interaction between each LCD keyswitch and the controlling processor is facilitated for substantially immediately relegending or refreshing of the display on the LCD keyswitch.

The interface circuit of the data input device includes a driver circuit having memory circuits to store data representative of the image displayed and includes a refresh function to retain the image on the display until a reset signal or new data is received.

The invention further provides a data input device comprising an interface circuit and a matrix of LCD keyswitches, each keyswitch being assigned a specific function changeable on operation of any one keyswitch. This arrangement is adaptable for use with a menu driven program running on the controlling processor or computer, each component of the menu being represented on the LCD keyswitches. Thus, when one keyswitch is pressed one or more of the other keyswitch images will change to represent the new menu.

The data input device may comprise either a keyboard, a keypad or a keystrip.

Preferably, the data input device includes a pointer device.

The data input device is adaptable for logging data received remotely wherein the data to be logged is displayed on the LCD keyswitch and said data is entered to memory by activating said keyswitch to confirm data entry.

The data input device interacts with software running on the controlling processor so that imbedded instructions or functions within the software are represented by images on the LCD keyswitches and are implemented by activating said keyswitches.

Advantageously, visual cues normally displayed on a computer visual display unit (VDU) are displayed or symbolically represented on the LCD keyswitches.

The data input device incorporates a user help system in which commands or instruction cues are displayed or symbolically represented on the LCD keyswitches. Preferably, the cues are concurrently displayed on the VDU.

The data input device may be used in conjunction with a computer running a graphical user interface (GUI) environment in which option button icons are displayed on the LCD keyswitches.

The present invention yet further provides a point-of-sale device comprising a matrix of relegendable LCD keyswitches and an interface circuit for interfacing the device with a controlling processor wherein point-of-sale data is selectively representable on each LCD keyswitch such that when a keyswitch is activated the data represented thereon is entered as part of a transaction, each LCD keyswitch being individually addressable and separately relegendable so that high speed, on-line interaction between each LCD keyswitch and the controlling processor is facilitated for substantially immediate relegending or refreshing of the display of the LCD keyswitch.

Advantageously, the data presented on the LCD keyswitches is representative of a point-of-sale function.

Optionally, the data presented on the LCD keyswitch is representative of a parameter relating to a sale item in a transaction.

The point-of-sale device may include a card reader and a card reader interface in communication with the interface circuit wherein data read from a card is used in the transaction. The data read from a card may be displayed on a screen so that security details may be checked or compared.

Advantageously, the point-of-sale device has at least two input/output (I/O) ports, the first port comprising a communication link between the point-of-sale device and a computer and the second port comprising a communication link to a peripheral device in which the communication link comprises a network such as a local area network (LAN).

The peripheral device may be a modem, a cash drawer driver, a printer, a computer or a second point-of-sale device.

The second and subsequent I/O ports are provided with Universal Asynchronous Receiver/Transmitter (UART) circuits for data transfer.

The present invention provides a point-of-sale device having a housing to facilitate the interchangeability of matrices of relegendable LCD keyswitches or standard switches, LCD screens, printing devices, magnetic strip card readers and I/O port driver circuits.

The present invention further provides a housing suitable for the construction of a point-of-sale device, the housing comprising an upper plate and a lower plate, the upper plate having a first aperture for receiving a card swipe guide and a second aperture for receiving a one or more LCD keyswitch (matrix) modules forming the functional part of the device and the lower plate having means for receiving circuit boards and receivers for holding the upper plate in snap engagement.

The housing includes apertures for I/O ports of which a primary port facilitates the connection of the device to a computer and the secondary and subsequent ports facilitates the connection of UART or driver circuits to peripheral devices.

The major breakthrough addressed by this invention is the real-time, interactive and on-line facilities provided. The invention may include the use of a terminate and stay resident (TSR) program, a driver circuit or a composite of both program and driver circuit, which is/are optionally installed in the PC to provide an interface between the application program developer or user and the hardware and firmware of the keyboard/keypad.

This software program (TSR or driver or a composite of both) allows the application developer or user access the keyboard/keypad or to an individual key by using simple function calls. The program must co-exist with other program drivers, and must not interfere with program chains, interrupt handlers, other TSRs, other applications, memory management, task switches etc. The program instructions remove the complexities and dangers of peripheral interfacing from the application program developer or user. The interface circuit provides a secure communication to and from the keyboard/keypad. The connection between the parallel port and the interface circuit of the keyboard/keypad is through a standard 25-way cable.

The interface circuit hardware and firmware and the keyboard/keypad circuit coupled with the interface software program running on the computer allows data be communicated in a fast, efficient and interactive way with address/data signal integrity.

Detailed schematic drawings of working embodiments of the interface circuit are discussed hereinafter and illustrate the interaction of LCD keyswitch and traditional keyswitch matrices in combination. Also discussed are devices having an interface circuit for use in data input or input/output. Further arrangements include those in which the interface circuit comprises a standard magnetic strip card reader where the interface circuit is used as a point-of-sale device, for example. The keyboard/keypad layout presented is for example only and limitations to the combination of keys is only a factor of the printed circuit board (PCB) layout. The interface circuit is adaptable to interface any number of keyswitches either as LCD keyswitches only or in combination with standard tactile keyswitches, for tactile keyswitches only, touch sensitive keyswitches or with membrane touch keyswitches, i.e. with any keyswitch which has an electrical output.

The keyswitch depress and release signals are communicated to the PC through the parallel port connector block in the interface circuit. A major advantage disclosed is that the keystroke information signals can be packed into the PC's existing keyboard buffer as if the data had come from a standard QWERTY keyboard. This facility allows the device comprising the LCD keyswitches to act as if it was a QWERTY keyboard. The keyswitch data is also available to the application program by simple function calls. This interface design allows the identification of "stuck keys" so that the keyboard continues to operate its normal functions whilst handling a problem key device.

The present invention which combines hardware, firmware and software facilitates a multi-tasking environment and provides data buffering for efficient performance. The software and/or firmware program (TSR, driver or composite or both) for controlling the LCD images schedules all outgoing events for a "safe" time and tries to respond "immediately" to any relevant incoming events. The program also facilitates a user or applications developer such that access to every feature available is allowed without reference to other features and is not related directly to how the interface circuit operates, other than to the relevant applications codes (e.g. error-handlers etc).

The interface circuits illustrated can be configured in a variety of ways using different components. The fundamental techniques facilitate control of the signal, data, address and ancillary lines combined with the programming of the central processor unit (CPU).

The interactive, on-line and real-time communication facility now available between the keyswitches and the PC provides an easy to use interface.

Each key on the keyboard/keypad is in fact an individual screen with or without backlit hues which can display alpha-numeric text, graphic or pictogram images.

The present invention may also be utilised to avoid complex keystroke combinations to execute simple instructions. A computer input device incorporating the present invention is therefore easier to operate and capable of immediate use as a practical business or operational tool without new users feeling intimidated into the necessity of having to gain a detailed knowledge of how a PC works. The combination of devices and techniques described herein and LCD keyswitches either on their own or in combination with traditional keyswitches will allow interactive, real-time on-line assistance to the user, to easily exercise choice from complex options with a simple keystroke.

The interface circuits outlined can be easily adapted using similar circuitry, firmware and software to provide interfaces to work stations, other programmable devices and equipment or be adapted for use as a stand-alone unit for connection to any high speed port or data bus of a computer.

The invention will hereinafter be more particularly described with reference to the accompanying drawings which show schematically, by way of example only, three embodiments of circuit used to provide an interface accord-

BRIEF DESCRIPTION OF THE DRAWINGS

FIGS. 1a to 1h are enlarged views of portions of a first embodiment of interface circuit;

FIGS. 3a to 3h are enlarged views of portions of a second embodiment of interface circuit;

FIG. 7 is a plurality of elevations similar to those of

FIGS. 6 and 6a showing operational elements of a point-of-sale device in place within the housing;

DETAILED DESCRIPTION OF THE PREFERRED EMBODIMENTS

Figure 1:
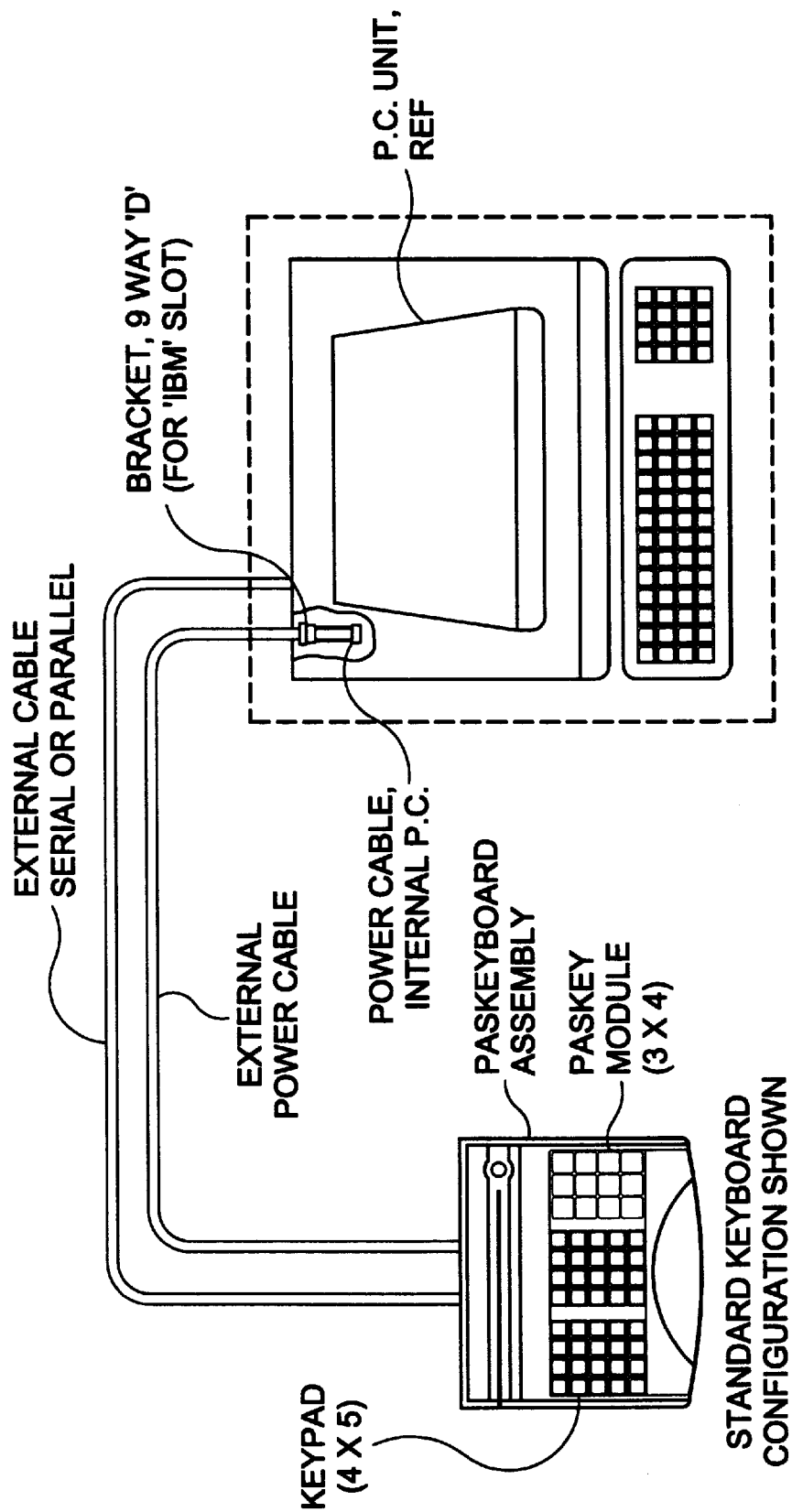
FIG. 1 is a view depicting the overall configuration of the present invention.

Referring to the drawings and initially to FIG. 1 and FIGS 1a to 1d which show a circuit for interfacing at least one matrix of LCD keyswitches in the form of a keypad or keyboard.

This keypad/keyboard interface circuit has been designed to interface a standard parallel input/output (I/O) port of a PC. The keypad/keyboard circuitry requires a separate DC power source. The DC input voltage can be in the range 9 volts to 28 volts. Connection to the PC is via a standard cable [25-way D-shaped plug to a 25-way D-shaped socket, with pin 1 connected to pin 1 etc. up to pin 25 to pin 25] engaging the port connector block CN2.

Figure 2A:
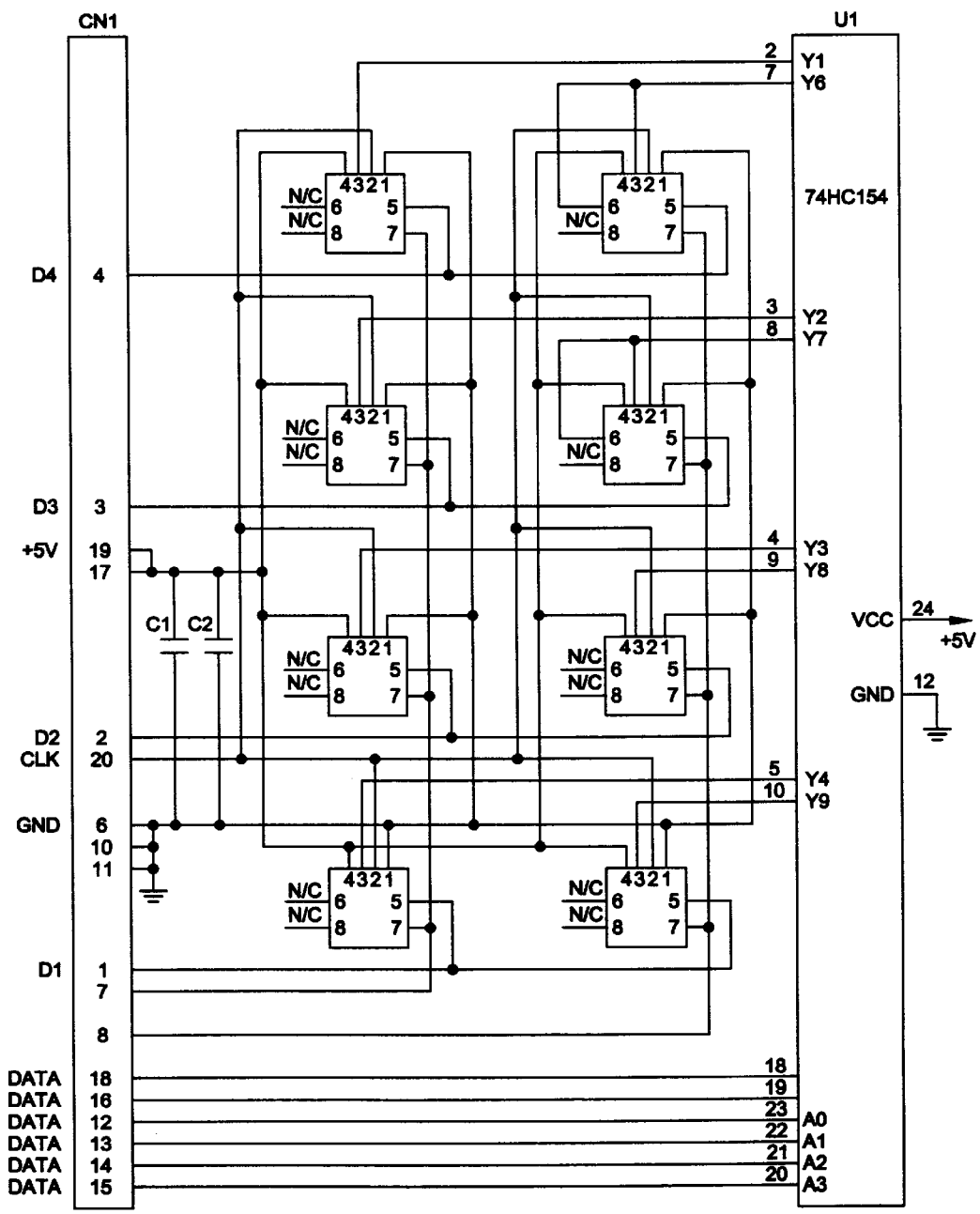
FIG. 2a is a schematic view of a circuit for connection to the interface circuit having a 4×2 matrix of relegendable LCD keyswitches.
Figure 2B:
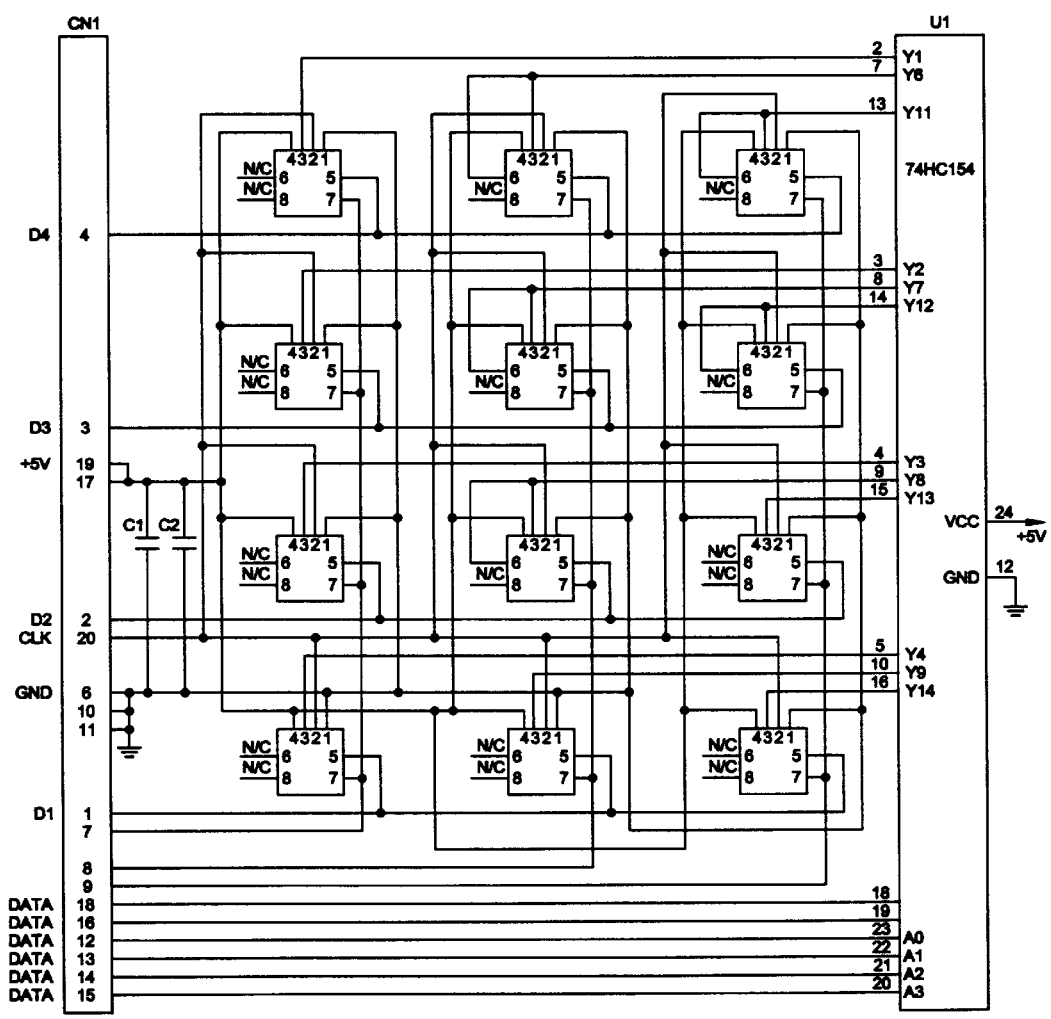
FIG. 2b is a schematic view of a circuit for a keyswitch interface having a 4×3 matrix of relegendable LCD keyswitches.
Figure 3A:
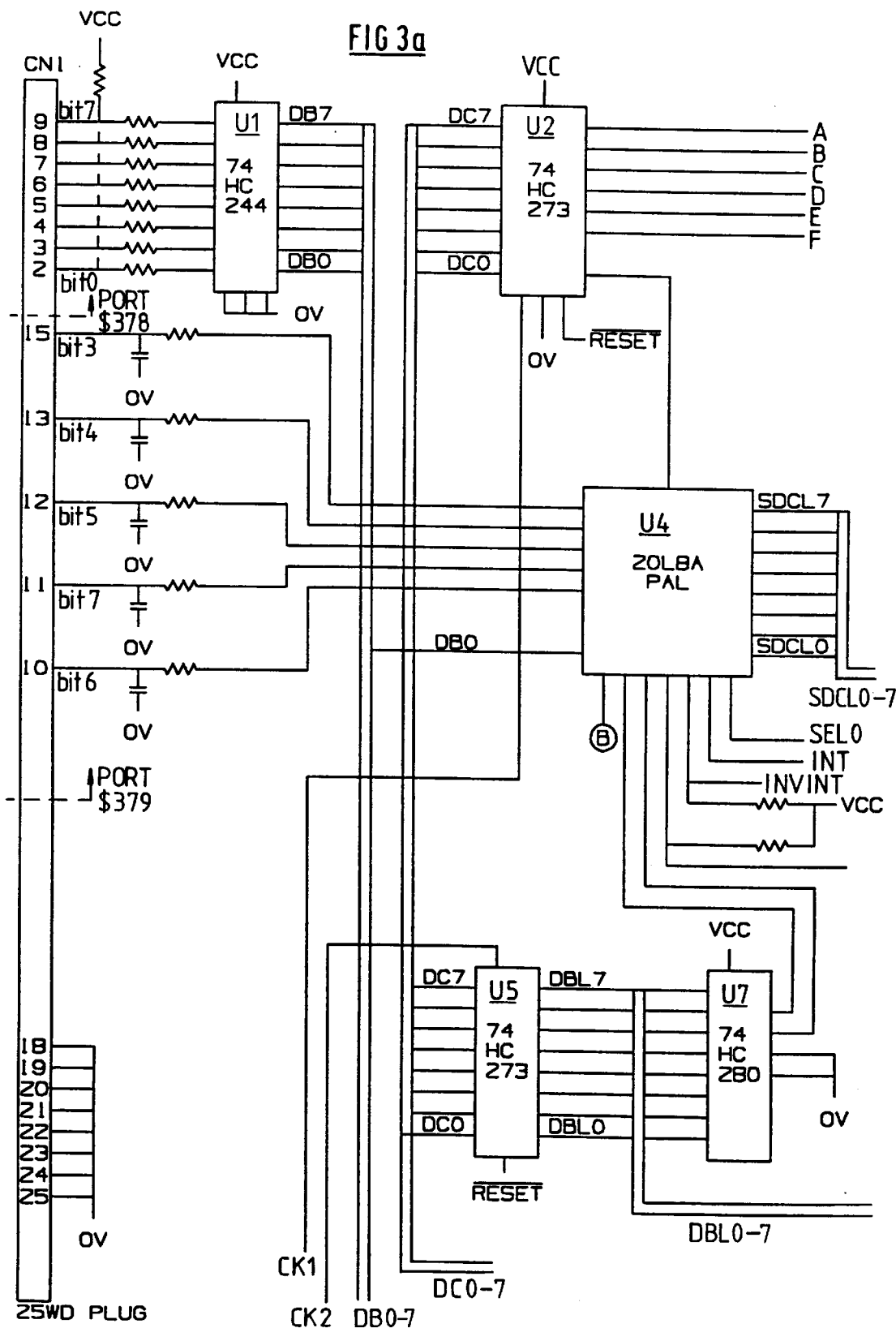
Figure 3B:
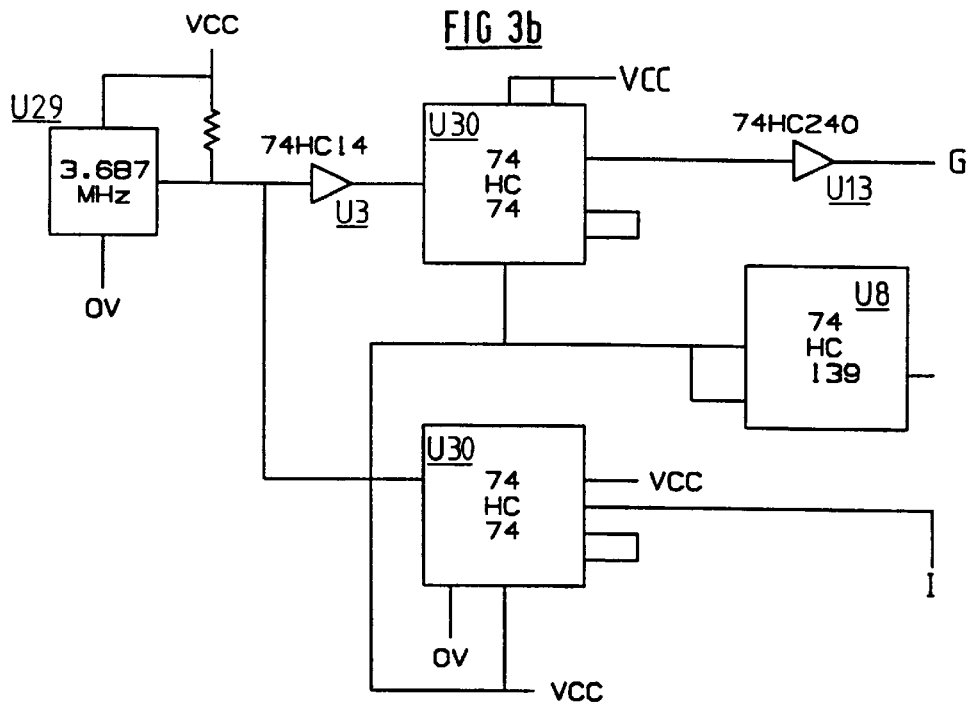
Figure 3B:
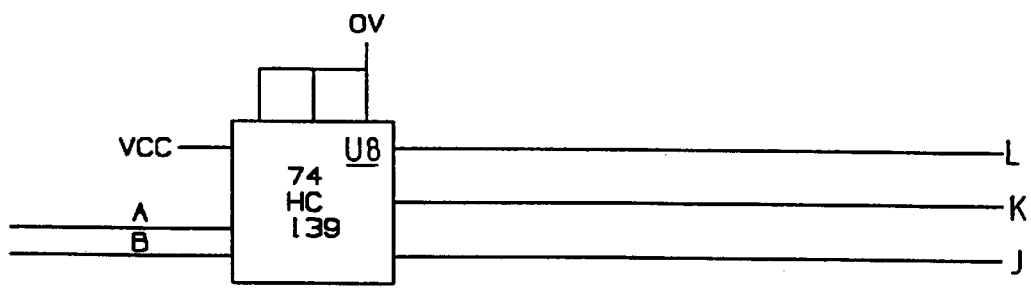
Figure 3B:
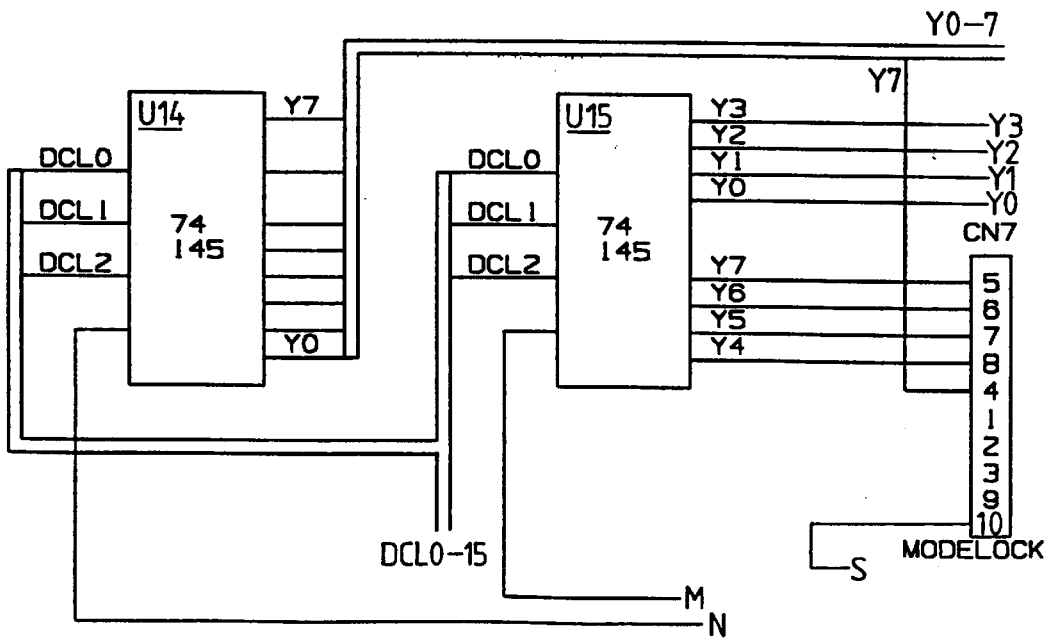
Figure 3E:
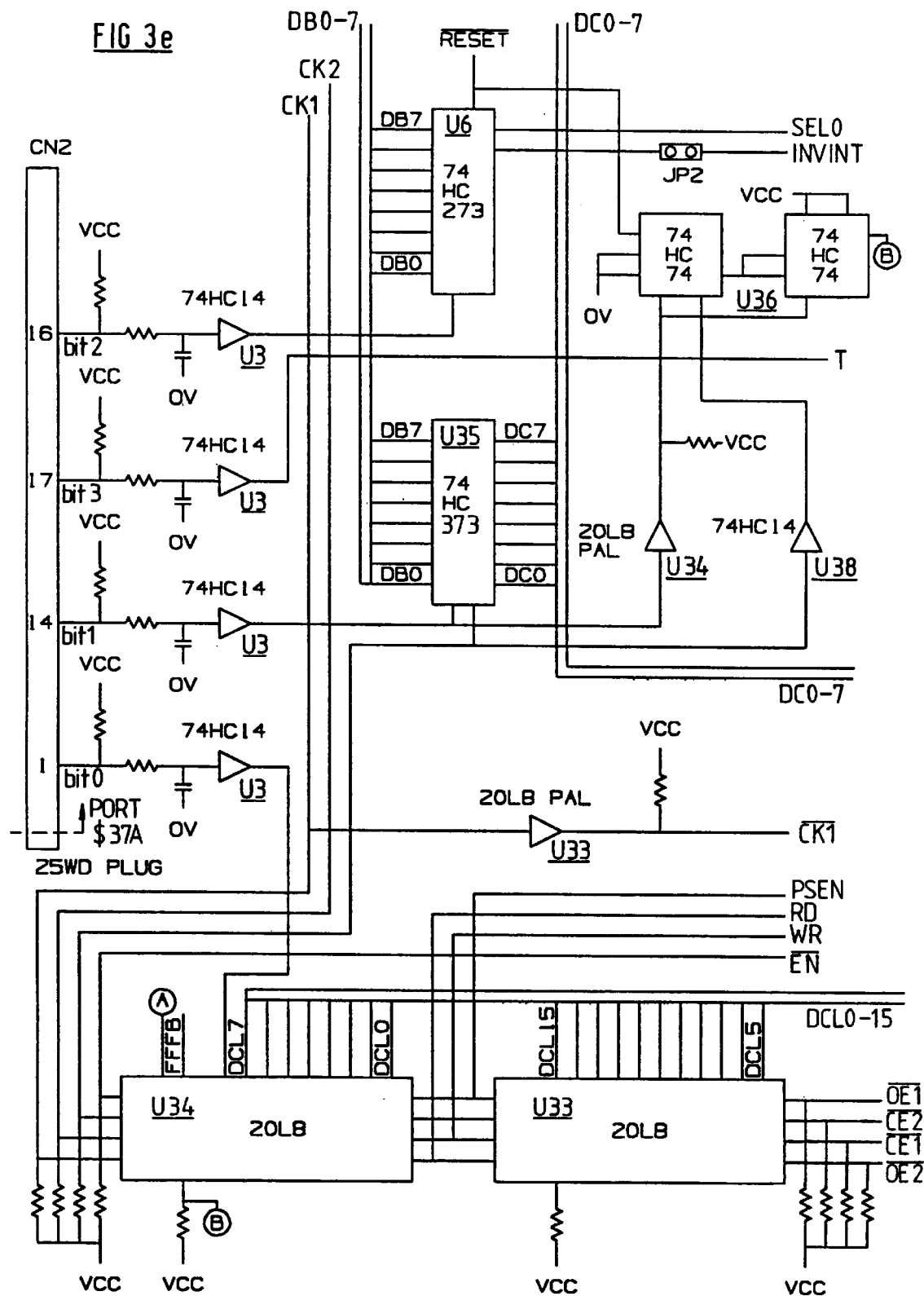
Figure 3F:
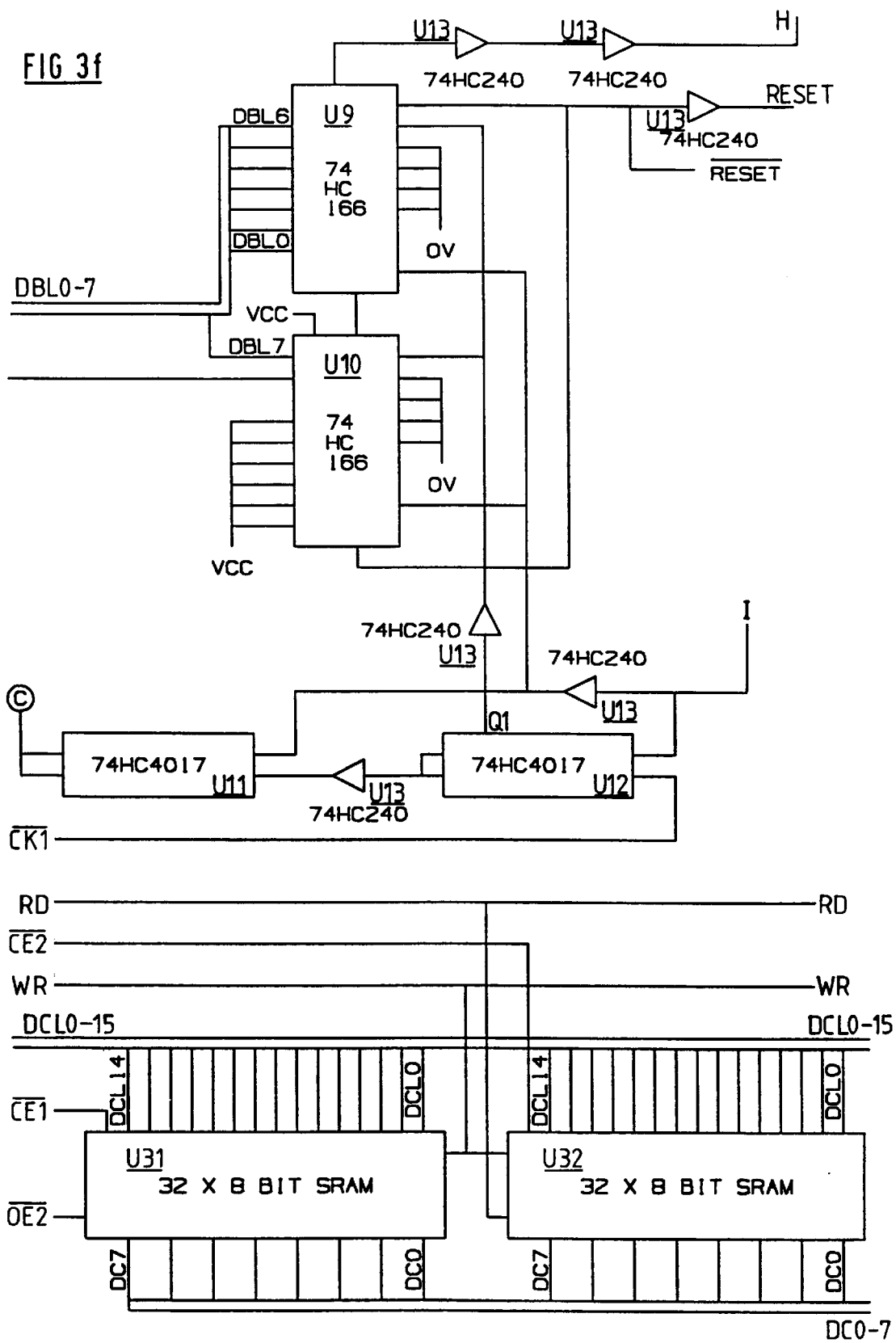
Figure 3H:
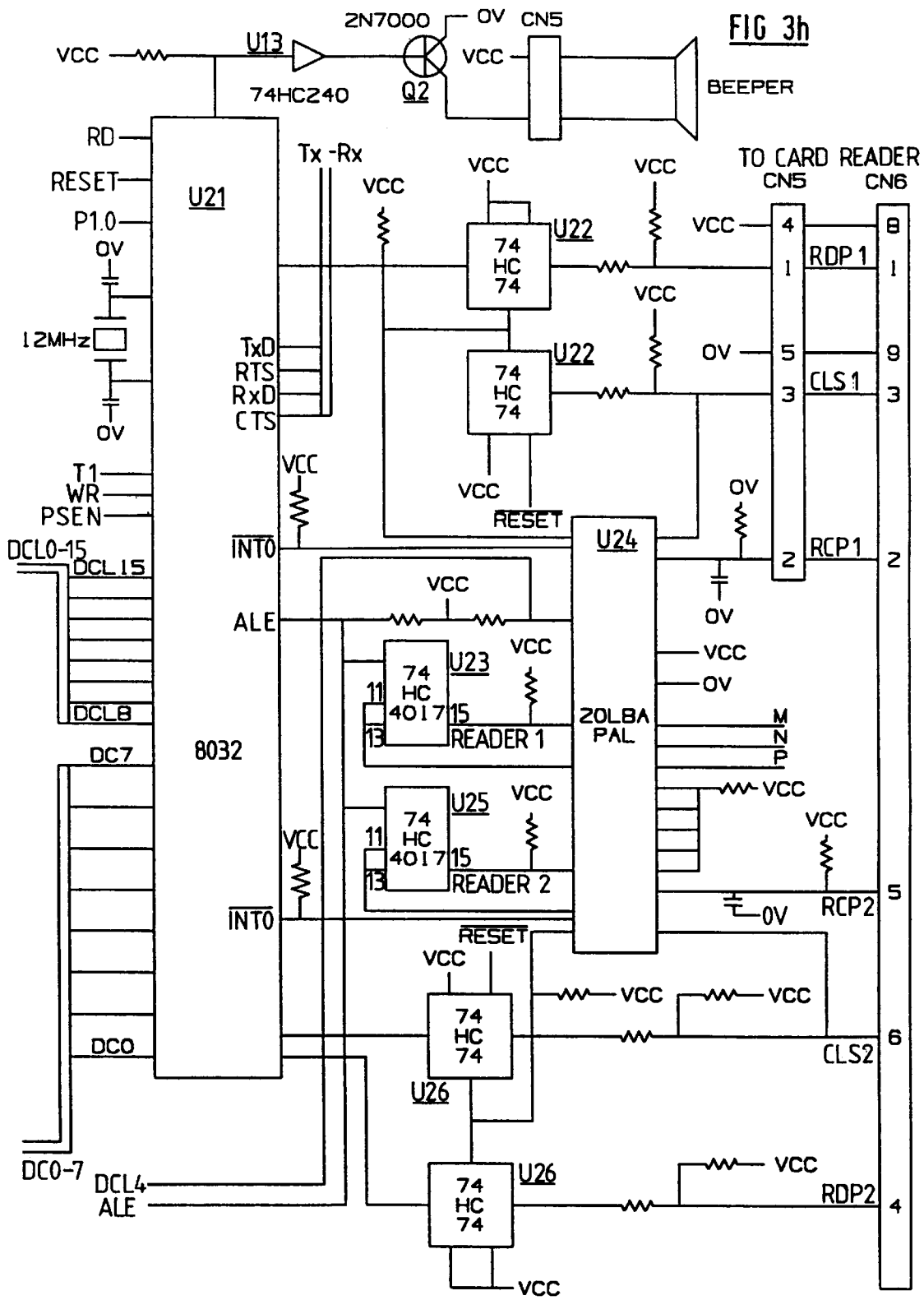

A first add-on printed circuit board (PCB) facilitates a matrix of four LCD keyswitches vertically and two LCD keyswitches horizontally, as illustrated in FIG. 2a. A second add-on PCB, illustrated in FIG. 2b, facilitates a matrix of four LCD keyswitches vertically and three LCD keyswitches horizontally. A standard four by five (4×5) or four by seven (4×7) keypad can be used to replace the 4×3 LCD keyswitch matrix of FIG. 2b.

For ease of explanation the circuit can be divided into three sections, a LCD screen interface circuit, a LCD keyswitch membrane and card reader interface and a DC to DC voltage convertor.

1. LCD Screen Interface 8-bit data is sent from the PC and buffered by a buffer integrated circuit (IC) U1(74HC244), using pins 2 to 9 of the 25-way D-shaped connector block CN2. This data is latched by pulsing on either pin 1 or pin 14 or pin 16 of the 25-way connector block CN2.

Data latched via pin 1 of the connector CN2 is directed through a further buffer IC U2 (74HC273) and the lines are used as follows:

bit 7 (pin 9) parity select (lo for LCD data) (hi for LCD address/data command)

bit 6 (pin 8) clock enable (lo for disable LCD clock) (hi to enable LCD clock)

bit 5 (pin 7) LCD keyswitch select address line 5 bit 4 (pin 6) LCD keyswitch select address line 4 bit 3 (pin 5) LCD keyswitch select address line 3 bit 2 (pin 4) LCD keyswitch select address line 2 bit 1 (pin 3) LCD keyswitch select address line 1 bit 0 (pin 2) LCD keyswitch select address line 0

The data latched via pin 14 is directed through a further buffer IC U5 (74HC273) and the lines are:

bit 7 (pin 7) data DBL7 sent to the LCD keyswitches bit 6 (pin 6) data DBL6 sent to the LCD keyswitches bit 5 (pin 5) data DBL5 sent to the LCD keyswitches bit 4 (pin 4) data DBL4 sent to the LCD keyswitches bit 3 (pin 3) data DBL3 sent to the LCD keyswitches bit 2 (pin 2) data DBL2 sent to the LCD keyswitches bit 1 (pin 1) data DBL1 sent to the LCD keyswitches bit 0 (pin 0) data DBLO sent to the LCD keyswitches The data latched via pin 16 is directed through a further buffer IC U6 (74HC273) similar to the buffer ICs U2, U5 and the lines are used as follows:

bit 7 (pin 9) lo to reset the CPU (U21) 8032 bit 6 (pin 8) se10: 1o connects the inverted Q1 output of the latch U12(74HC4017) to pin 11 of the 25-way D-shaped connecter block CN2.

:hi connects data inputs from the keyswitch 8032 CPU to pin 15, pin 13, pin 25 and pin 11 of the 25-way D-shaped connector block CN2.

bit 5 (pin 7) not used bit 4 (pin 6) INVINT (hi INVerts and INTerrupts line to the PC)

bit 3 (pin 5) not used bit 2 (pin 4) not used bit 1 (pin 3) hi to sound beeper B1 bit 0 (pin 2) hi tells the controller CPU U21 (8032) to send its internal random access memory (RAM) to the PC.

A parallel converter IC U7 (74HC280) generates a parity bit for LCD data. Parallel-to-serial converter ICs U9, U10 (74HC166) convert the parallel (8-bit) LCD data signals to serial LCD data signals. Latches U11, U12 (74HC4017) send a signal to the PC to say that the LCD keyswitches are busy (lo on pin 11 of the 25-way connector block CN2) or the LCD keyswitches are ready to receive data (hi on pin 11 of connector block CN2). The output Q1(pin 2) of latch U12 strobes the parallel LCD data into the parallel-to-serial convertor ICs U9, U10. This happens approximately 1 clock period after the strobe pulse (on pin 14 of the connecter block CN2) has finished.

The clock for the LCD keyswitches can be selected from two sources:

Source 1 (join connector CN14 pin 1 to pin 2) is the ALE signal (at pin 30) from the CPU U21 (8032).

Source 2 (not usually fitted to the PCB, join connector CN14 pin 2 to pin 3) is derived from a 4 MHz crystal oscillator U29 which is divided by two by a divider IC U30(74HC74) to produce two 2 MHz signals phase shifted from each other by 90 degrees.

2. Keyswitch Membrane and Card Reader Interface

The keyswitch and card reader interface uses the CPU U21 to scan the keyswitches and store about eight keystrokes and to interface the CPU with either a one-track or two-track card reader. The CPU can hold two tracks of information from one card swipe. The CPU uses an external 8 kByte read-only memory (ROM) U19 to hold its program code. In this embodiment the PC can only read four bits at a time from the CPU U21(8032). The 8-bit data bus of the CPU is selected four bits at a time via a programmable array logic (PAL) IC U24 provided that the select signal sel0 is hi.

With select signal sel0 hi and d0 lo:

pin 11 of the connector CN2 is sdc17 (latched bit 7 of the CPU databus);

pin 12 of the 25 way D-shaped connector CN2 is sdc16 (latched bit 6 of the CPU databus);

pin 13 of the connector CN2 is sdc15 (latched bit 5 of the CPU databus); and pin 15 of the connector CN2 is sdc14 (latched bit 4 of the CPU databus).

With sel0 hi and db0 hi:

pin 11 of the connector CN2 is sdc13 (latched bit 3 of the CPU databus);

pin 12 of the connector CN2 is sdc12 (latched bit 2 of the CPU databus);

pin 13 of the connector is sdc11 (latched bit 1 of the CPU databus); and pin 15 of the connector CN3 is sdc10 (latched bit 0 of the CPU databus).

Once a keystroke has been received or a card swiped, the CPU U21 causes an interrupt signal to be passed to the PC via pin 10 of the 25 way D-shaped connector CN2. This interrupt (hi for interrupt) is generated by a latch IC U17 (pin 9) when the $\overline{wr}$ line (pin 16) of the CPU U21 is pulsed lo. The PC reads the 8-bit data then signals the CPU that the data has been read, by pulsing lo on pin 17 of the 25 way D-shaped connector CN2, to set CPU input T1 (pin 15) lo via the latch U17.

The CPU will then send all its available data using the above handshake. For debugging purposes the PC can tell the CPU U21 to send all the contents of its internal RAM (256 Bytes). To do this the PC sets pin 10 of the CPU hi.

Latches U23 (74HC4017), U25(74HC4017) and a PAL IC U24(2018) are used to generate an end of card interrupt signal. Latch ICs U22 (74HC74), U26(74HC74) clock one bit at a time of the incoming card data. The more significant hardware functions and programed instructions of the CPU U21 (8032) are detailed below:

Timer-0: Programmed to interrupt every 25 milliseconds, for example, or continuously. This interrupt signal is used to:

Decrement "coarse" time-outs, those in multiples of 25 milliseconds.

Scan the keyboard (and key-lock, looking for "stuck keys").

Retain all "previous" scan data in a buffer, 128 keys, 16 Bytes of RAM image, 16 columns, 8 rows.

Start the scan at column-1, read the 8 bits there.

See if any CHANGE.

If no change has occurred, assume that those 8 bits are stable, and ignore the data read.

If there is a change, calculate the key(s) now closed, or open, build that data entry in the PC-buffer. If no space is available in the PC-buffer, select the "overflow" flag and do not transfer the data to the PC. Retain the 8 bits in the previous scan data buffer.

Repeat for each column.

Timer-1: Use the "T1" input pin, as a test-pin to be used in the PC communications protocol.

Timer-2: Programed to interrupt perhaps every 1 milliseconds or continuously. Used to decrement "fine" time-outs, those in multiples of 1 milliseconds.

Ext0: External Interrupt Input.

Used to identify activity on Track-1 (or Track-2, or Track-3 if selected) of the card-reader. If an interrupt condition arises, it may be caused by either:

CLS active, CLOCK just active, data-bit ready. In this case, the data-bit must have been latched, as from the time the clock went active, and the code reads and saves the data-bit.

CLS inactive. This indicates that the card has been removed, and so all retained bits/bytes can be checked, and sent to the PC.

The state of CLS, at the time the interrupt started, must be latched, so that the program code can detect whether the Ext0 interrupt was caused by CLS going inactive or by a data-bit.

Data can be collected from up to two tracks at a time. These data-bits are held in the relevant PC buffer until all the tracks have been read. Data-bits should be collect, (while there is buffer-space), until an end-of-card signal has been detected. When this signal is received the buffer is available for sending data to the PC. As the buffer is ready for transferring data to the PC, no further bits can be read (from the same track). If some additional data-bits are read, a warning beeper B1 will sound and the bits are ignored. If a track is read and some errors are detected, beeper B1 also activates and the data is discarded. If some valid bits are detected, and there is a long time-out before further bits or end-of-card signals are detected, the beeper sounds and the retained data is discarded.

For each of these errors, specific error codes are relayed to the PC indicating which error was detected.

Ext1: External Interrupt Input. As for Ext0, 2nd track.

Mainline: Checks for time-out signals while reading data bits from the card-reader. If any relevant periods expires a time-out flag is activated to show errors have occurred, these errors produce signals to sound the beeper B1.

If any card reader error codes are to be sent to the PC, signals must be relayed to the PC and the CPU must wait for the PC to collect the data. If the PC does not respond at all (after a predetermined time-out period), the beeper B1 sounds indicating that data is still available for the PC. If the PC communication link dies during the transfer, the beeper is sounded severely, an error-code is posted and this transfer is terminated. When completed, the CPU reverts back to the "mainline" routine, in case further data has been collected.

If a card reader buffer is ready to send data to the PC, the data is sent to the PC as detailed above. After a successful transfer, the CPU reverts back to the "mainline" routine.

The above procedure is also followed if any keyboard errors have arisen and if any keyboard characters (Closed or Open) should be transferred.

On start-up the following procedures incorporated in software are implemented:

Initialise stack, keyboard buffers, card-reader buffer, etc, to specific values in RAM, of facilitate analyses of RAM-dumps.

3. DC to DC Convertor

A switching regulator integrated circuit (LM2576T-5) is used to step down the DC input voltage to 5 volts DC. The maximum current that this integrated circuit can supply is 3 Amps. A heat sink is attached to this IC (LM2576T-5) to dissipate the heat generated. A switching circuit centred about a TL 7705A IC U27 is used to provide a 100 ms reset pulse to initialise the interface circuit when input power is first applied.

Referring now to FIGS. 3 and 3a to 3d, a second embodiment of interface circuit is shown. This circuit is a refinement of that shown in FIG. 1 and FIGS. 1a to 1d and shares common characteristics. The significant difference between the circuits is the incorporation of further on-board memory, to facilitate the refreshing of the LCD keyswitches within the interface circuit.

Substantially as before, the PC parallel port is designated, for example, as one of the following:

$$I/O \text{ port address } \$3BC$$
$$\$378$$
$$\$278$$

The following interrupt request (IRQ) selection should be incorporated within programming;

The PC I/O port at $3BC, $378, or $278 latches eight bits of data to send to the interface circuit. This I/O port at $3BD, $379 or $279 is used to read data, four bits at a time, from the interface circuit. A fifth bit at this address causes an interrupt signal to be sent to the PC via the interrupt request (IRQ) line selected. The PC I/O port at $3BE, $37A or $27A has four output strobe lines which are used separately in the interface circuit via the connector as follows:

bit 0 (pin 1) pulse hi to reset keyboard.

bit 1 (pin 14) pulse hi to latch eight bits of data for the CPU (8032).

bit 2 (pin 16) pulse lo to latch eight bits of control data.

bit 3 (pin 17) pulse hi to acknowledge to the CPU (8032) that the PC has taken data.

bit 4 (pin 13) set hi to enable the parallel port interrupt line.

*Note: from now on the parallel port will be considered to start at $378.

Before running any programs the parallel port designation must be established for example starting at 378 and set up as follows:

input $37A store bit7,bit 6,bit5 to use in every write to $37A output $37A, #xxx0 0101.

This sets the following pins on the 25-way D-shaped connector block CN2:

bit 0 (pin 1) will be lo; This holds the keyboard in a reset condition.

bit 1 (pin 14) will be hi.

bit 2 (pin 16) will be hi.

bit 3 (pin 17) will be hi.

bit 4 not connected: will be lo to disable the interrupt line. Note: bit 4 has no connection to the 25-way D-shaped connector.

Output $378

This sets the following pins on the 25-way D-shaped connector:

bit 0 (pin 2) will be lo.

bit 1 (pin 3) will be lo.

bit 2 (pin 4) will be lo.

bit 3 (pin 5) will be lo.

bit 4 (pin 6) will be lo.

bit 5 (pin 7) will be lo.

bit 6 (pin 8) will be lo.

bit 7 (pin 9) will be lo.

Output $37A,#xxx1 0100 to remove the keyboard reset and enable the parallel port interrupt line.

The following table illustrates the designations of the pins for the 25-way D-shaped connector block CN2 and their associate signals.

| Computer Port Address | Computer side signals Parallel port | | Interface circuit Chassis mounted plug CN2 | |
|---|---|---|---|---|
| | OUTPUT | | INPUT | |
| $378 Send Data Out | Data bit7 | ---------------------- | 9 | D7 |
| | Data bit6 | ---------------------- | 8 | D6 |
| | Data bit5 | ---------------------- | 7 | D5 |
| | Data bit4 | ---------------------- | 6 | D4 |
| | Data bit3 | ---------------------- | 5 | D3 |
| | Data bit2 | ---------------------- | 4 | D2 |
| | Data bit1 | ---------------------- | 3 | D1 |
| | Data bit0 | ---------------------- | 2 | D0 |
| | OUTPUT | | INPUT | |
| $37A Send strobe pulses | −Strobe ($\overline{\text{bit0}}$) | ---------------------- | 1 | A0 |
| | −Auto feed ($\overline{\text{bit1}}$) | ---------------------- | 14 | A1 |
| | −Init (bit2) | ---------------------- | 16 | A2 |
| | −Select in ($\overline{\text{bit3}}$) | ---------------------- | 17 | A3 |
| | IRQ Enable (bit4) hi to enable | | | |
| | INPUT | | OUTPUT | |
| $379 Read Data In | −Error (bit3) | ---------------------- | 15 | |
| | +Select (bit4) | ---------------------- | 13 | |
| | +PE (bit5) | ---------------------- | 12 | |
| | +Busy ($\overline{\text{bit7}}$) | ---------------------- | 11 | |
| | −Ack (bit6) | ---------------------- | 10 | INT |

Note: (a) Writing a 0 (lo) to bit0 on port $37A causes pin 1 of the connector CN2 to go hi.

(b) Writing a 0 (lo) to bit1 on port $37A causes pin 14 of the connector CN2 to go hi.

(c) Writing a 1 (hi) to bit2 on port $37A causes pin 16 of the connector CN2 to go hi.

(d) Writing a 0 (lo) to bit3 on port $37A causes pin 1 of the connector CN2 to go hi.

(e) If pin 10 of the connector CN2 is hi then reading bit6 of port $379 returns a hi.

(f) If pin 11 of the connector CN2 is hi then reading bit7 of port $379 returns a lo.

(g) If pin 12 of the connector CN2 is hi then reading bit5 of port $379 returns a hi.

(h) If pin 13 of the connector CN2 is hi then reading bit4 of port $379 returns a hi.

(i) If pin 15 of the connector CN2 is hi then reading bit3 of port $379 returns a hi.

Once the PC parallel port is initialised as described above, eight bits of data is sent from the PC and buffered by buffer IC U1(74HC244), using pins 2 to 9 of the connector CN2. This data is latched by pulsing lo on either pin 14 or pin 16 of the connector CN2.

The data latched in adjacent buffer U35(74HC373) via pin 14 (bit1 of port $37A) is used as follows:

bit7 (pin 9) data dc7 sent to the CPU (8032).

bit6 (pin 8) data dc6 sent to the CPU (8032).

bit5 (pin 7) data dc5 sent to the CPU (8032).

bit4 (pin 6) data dc4 sent to the CPU (8032).

bit3 (pin 5) data dc3 sent to the CPU (8032).

bit2 (pin 4) data dc2 sent to the CPU (8032).

bit1 (pin 3) data dc1 sent to the CPU (8032).

bit0 (pin 2) data dc0 sent to the CPU (8032).

The above data is actually latched in the buffer IC U35(74HC373) by the following output sequence: output $37A,#xxx1 0100, output $37A, #xxx1 0000 and output $37A,#xxx1 0100.

A flag is set hi on a flip-flop U36 (pin 9) automatically when data is latched. This flag is then inverted and can be read at bit7 of the port $379 via the PAL IC U4 (20L8A). This hi signal on bit7 of the port $379 means that the CPU (8032) is busy and has not taken the byte sent by the PC.

The data latched in a parallel buffer U6(74HC273) via pin 16 of the connector CN2 (bit2,port $37A) is used as follows:

bit7 (pin 18) not used bit6 (pin 17) sel0: lo connects the inverted Q output (pin 9) of the flip-flop U36 (74HC74) to pin 11 of the connector CN2.

bit5 (pin 14) not used bit4 (pin 13) INVINT (hi inverts the interrupt line to the PC) This should be hi for an XT and lo for an AT or higher specified PC.

bit3 (pin 8) not used bit2 (pin 7) not used bit1 (pin 4) not used bit0 (pin 3) not used.

The above data is actually latched in the buffer IC U6 (74HC273) by the following output sequence:

output data to $378, output $37A,#xxx1 0100, output $37A, xxx1 0110 and output $37A,#xxx1 0100.

The CPU has supporting circuitry and facilities as follows:

The read-only memory (ROM) available to the CPU is selected by altering the settings of a jumper JP1 disposed adjacent memory IC U19 (27C64 or 27C128).

With the jumper JP1 OUT the ROM size will be 16 kBytes (27C128).

With the jumper JP1 IN the ROM size will be 32 kBytes (27C256).

The CPU clock crystal is 12 MHz. Programmable array logic (PAL) ICs U33, U34(20L8) are external RAM memory address decoders for the CPU (8032).

The external RAM size can be 32 kByte or 64 kByte. The lower RAM addresses are $0000 to $7FFF in a first static RAM (SRAM) IC U37(32 kByte×8 bits).

The lower RAM is also mapped to ROM addresses $8000 to $FFFF. The higher RAM addresses are $8000 to $FEFF in a second SRAM IC U32 (32 KByte×8 bits) The addresses $FF00 to $FFFF are reserved for LCD, keyboard and other activity.

RAM address designations are as follows:

| | |
|---|---|
| $FFFE | read to get data from the PC via latch IC U35(74HC373). |

| | |
|---|---|
| | (when the data byte is ready the flip-flops flag U36(74HC74), pin 9 is cleared to lo automatically) |
| $FFFE | write data to the PC via latch IC U18(74HC373). (interrupt INT flag of flip-flops U17, pin 9 (74HC74) is set hi automatically to interrupt the PC) |
| $FFF9 | write parity and chip select LCD addresses to the buffer IC U2(74HC273) |
| $FFF8 | write data to the LCD keyswitches via latch IC U5(74HC273). (data is automatically sent serially to the LCD's via the parallel-to-said converter U9(74HC166), pin 13 |
| $FFA0 to $FFBF | read data from the keyboard via buffer IC U16 (74HC244) |
| $FFFA | read data about keyboard construction via buffer IC U37(74HC244): bit0 lo, bit1 hi means bank0 is LCD keyswitch type lc16(4×3 matrix) bit0 ho, bit1 lo means bank0 is LCD keyswitch type lc24 (4×3 matrix) bit0 hi, bit1 lo reserved bit0 hi, bit1 hi means bank10 is a preh keypad. bit2 lo, bit3 hi means bank0 keyswitch type lc16 (4×3 matrix) bit2 lo, bit3 lo means bank0 is LCD keyswitch type lc24(4×3 matrix) bit2 hi, bit3 lo reserved bit2 hi, bit3 hi means bank0 is a preh keypad. bit4 lo, bit5 hi means bank0 is LCD keyswitch type lc16(4×3) bit4 lo, bit5 lo means bank0 is LCD keyswitch type lc24(4×3) bit4 hi, bit5 lo reserved bit4 hi, bit5 hi means bank0 is a preh keypad. bit6 hi means that a byte is available from the PC. This bit is automatically set to 0 (lo) when the CPU (8032) reads RAM address $FFFE. bit 7 hi means that the LCD keyswitches are not busy. |

The keyswitch membrane and card reader interface circuit of the second embodiment is provided with enhanced features over the first embodiment circuit. This interface uses the CPU U21 to scan the keyswitches and store about eight keystrokes internally, as before. A maximum of fifty-five keystrokes can be held in the external RAM. The CPU also interfaces to either a one-track or a two-track OMRON card reader. The CPU U21 (8032) can hold two tracks of information from one card swipe. The CPU uses an external 8 kByte ROM U19 to hold its program code. The PC can only read four bits at a time from the CPU. The 8-bit data bus of the CPU is selected four bits at a time via the PAL IC U4(20L8) provided the select signal sel0 on PAL IC U4 (pin 16) is hi.

With the select signal sel0 hi and the data line db0 lo (port $378), port $379 is read as follows:

bit7 (pin 11) of the connector is SDCL7 (latched bit7 of the databus)

bit5 (pin 12) of the connector is SDCL6 (latched bit6 of the databus)

bit4 (pin 13) of the connector is SDCL5 (latched bits of the databus)

bit3 (pin 15) of the connector is SDCL4 (latched bit4 of the databus)

With select signal sel0 hi and the data line db0 hi (port $378), port $379 is read as follows:

bit7 (pin 11) of the connector is SDCL3 (latched bit3 of the CPU databus)

bit5 (pin 12) of the connector is SDCL2 (latched bit2 of the CPU databus)

bit4 (pin 13) of the connector is SDCL1 (latched bit1 of the CPU databus)

bit3 (pin 15) of the connector is SDCL0 (latched bit0 of the CPU databus).

Once a keystroke has been received or a card swiped the CPU causes an interrupt in the PC via pin 10 of the connector CN2. This interrupt signal INT (hi for PC interrupt) is generated by the flip-flop output Q, pin 9 U17 when the CPU (U21) outputs data to RAM address $FFFE. The PC reads the 8-bit data then signals the CPU, by pulsing lo on pin17 of the connector CN2 (bit3, port $37A) to set the CPU input T1 (pin 15) lo via a latch IC U17, that the data has been read. The CPU will then send all its available data using the above handshake.

Latches U23(74HC4017), U25(74HC4017) and the PAL IC U24 (20L8) are used to generate an end-of-card interrupt. When a two-track card is being read the CLS1 and CLS2 signals (on pins 3 and 6 of connector CN6) go lo. These are inverted in the PAL IC U24(20L8) to hold pin 15 of each of the latches U23,U25 (74HC4017) hi which is a reset condition. Pin 11 and pin 13 are held lo. After the card has been read the CLS signals go hi, thus removing the reset conditions on the latches U23, U24 (74HC4017). The CPU interrupt inputs $\overline{INT0}$, $\overline{INT1}$ and are set hi at the end of the clock/data interrupts. The latches U23,U25 (74HC4017) are then clocked-by the CPU ALE signal (pin30) until the TxD output, pin 11 goes hi which makes pin 13 (ce) go hi and thus stops the latches U23,U25 (74HC4017) counting. This sets the CPU interrupt inputs $\overline{INT0}$ and $\overline{INT1}$ lo thus causing end-of-card interrupts in the CPU.

Latches U22(74HC74), U26(74HC74) latch are one bit at a time of the incoming card data. The card reader signals are:

| | |
|---|---|
| CLS | lo only while a card is being read by the magnetic head, normally hi. |
| RDP | card data. |
| RCP | card clock; normally hi; data is latched into latch ICs U22(74HC74) or U26(74HC74) on the falling edge of RCP signals (i.e. hi to lo). Pin 18(CLS1)/pin 16(CLS2) of the PAL IC U24(20L8) goes lo to hi on this edge. Pin 19(INT0)/pin 22 (INT1) of the PAL IC of U24(20L8) goes hi to lo on this edge to cause an interrupt (INT0, INT1) in the CPU. The CPU then reads the card data on track 1. |

A clock for the LCD keyswitches is derived from a 4 MHz crystal oscillator IC U29, the output of which is passed through a divide-by-two IC U30(74HC74) to produce two 2 MHz signals phase shifted 90 degrees from each other.

Parallel convertor IC U7 (74HC280) generates a parity bit for LCD data. Parallel-to-serial converter ICs U9, U10 (74HC166) convert the parallel 8-bit LCD data to serial LCD data.

Latches U11, U12 (74HC4017) send a signal to the CPU to say that the LCD keyswitches are busy (hi on bit7 of external RAM address $FFFA). The output Q1(pin 2) of the latch U12(74HC4017) strobes the parallel LCD data into the parallel-to-serial convertors U9, U10(74CH166). Strobing happens approximately 1 LCD clock period after the CPU write pulse, to external RAM address $FFFE, has finished.

To send eight bits of data from the CPU to the LCDs first, a particular LCD is selected and the data is outputted to the RAM address $FFF9, thus data will be latched via the buffer IC U2(74HC273).

bit7(pin 19) is set hi only when an address command is being sent to the LCD keys bit6(pin 16) not used bit5(pin 15) lo, bit4 (pin12) lo selects bank 0(cn9)

bit5(pin 15) hi, bit4 (pin12) hi selects bank 1(cn11)

bit5(pin 15) hi, bit4 (pin12) lo selects bank 2(cn12)

bit5(pin 15) hi, bit4 (pin12) hi selects bank 3(not used)

bit3 to bit0 (pins 9,6,5,2) select any one of 15 displays on a bank (i.e. up to a 4×4 matrix).

Then, output the LCD data to RAM address $FFF8. Latches U11, U12(74HC4017) are reset by this write pulse. Latch U11(74HC4017), pin 11 will be set lo indicating the at the LCD's are busy. The CPU reads this lo at RAM address $FFFA(bit7).

Output Q1(pin 2) of the latch IC U12 strobes the parallel LCD data into the parallel-to-serial convertors U9, U10 (74HC166) which convert the parallel 8-bit LCD data to serial LCD data. Data is clocked out of the converter U9(74HC166) at 2 Mbits per second to the LCD connection block selected by the buffer U2(74HC273). Pin 11 of the latch U11(74HC4017) will be set hi when the LCD data has been completely sent and so that LCD keyswitches are not busy. The CPU read this hi at RAM address $FFFA(bit7).

Figure 4A:
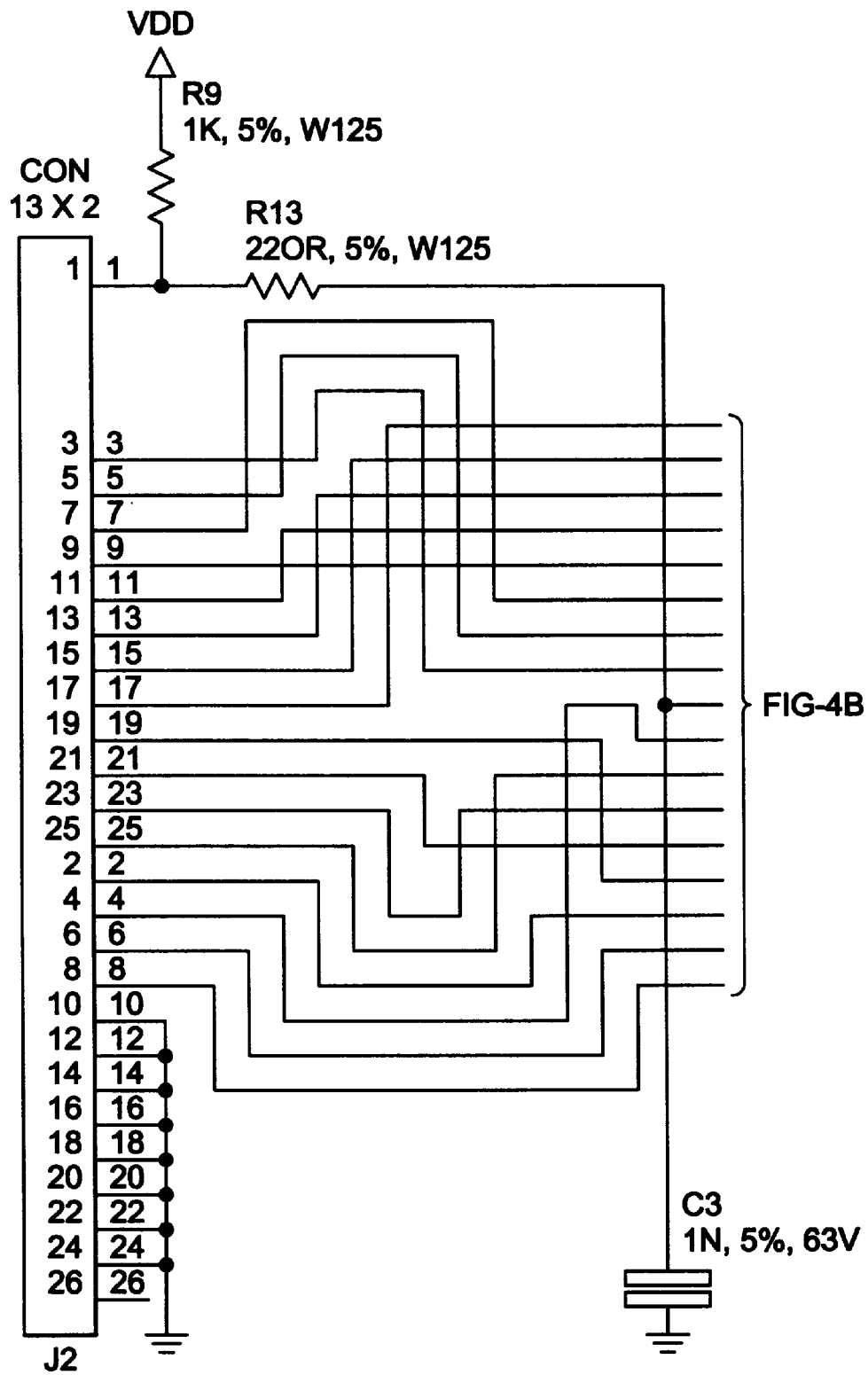
FIGS. 4a to 4n are schematic views of a third embodiment of interface circuit having improved performance by virtue of an Application Specific Integrated Circuit (ASIC)
Figure 4D:
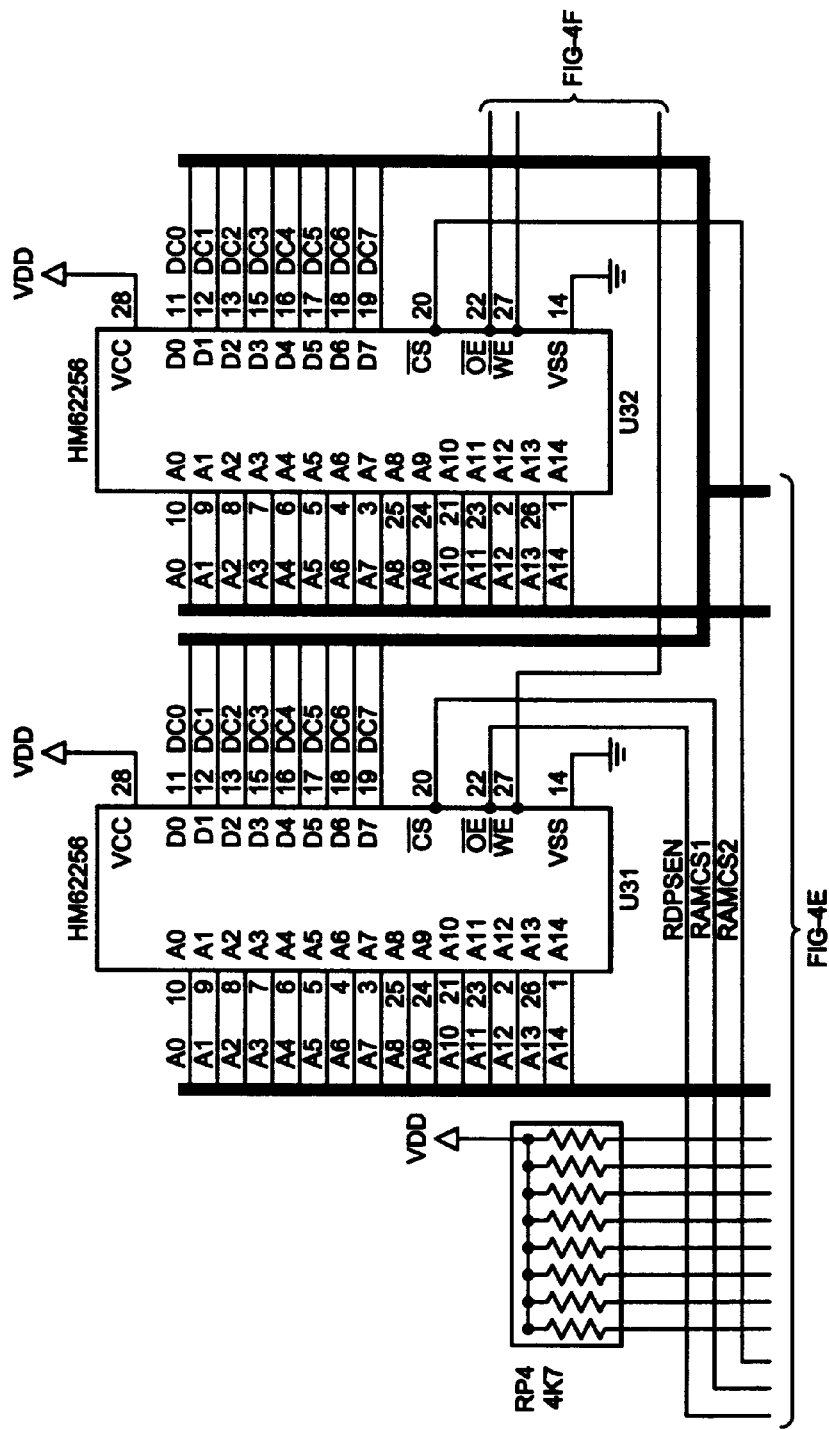
Figure 4F:
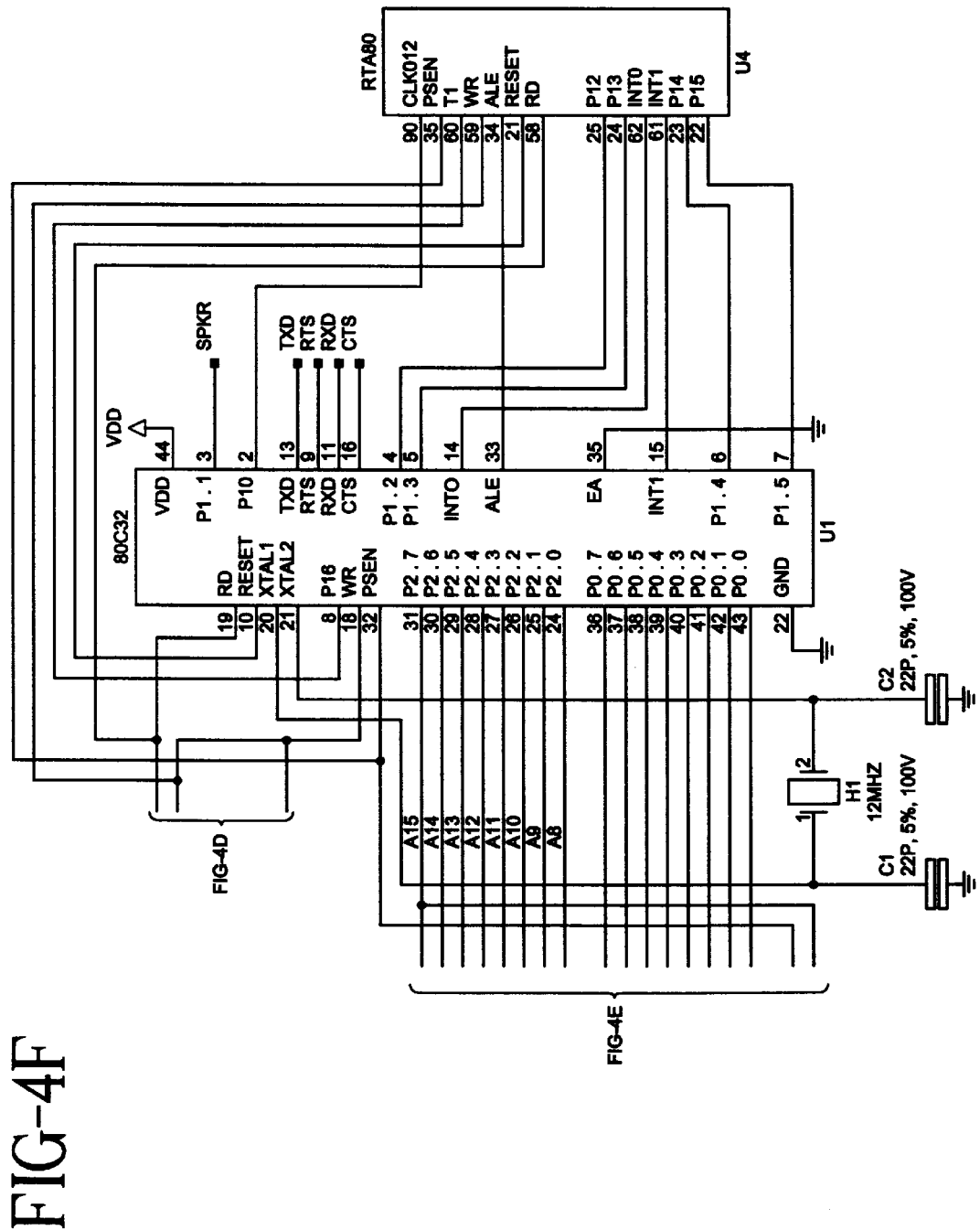
Figure 4G:
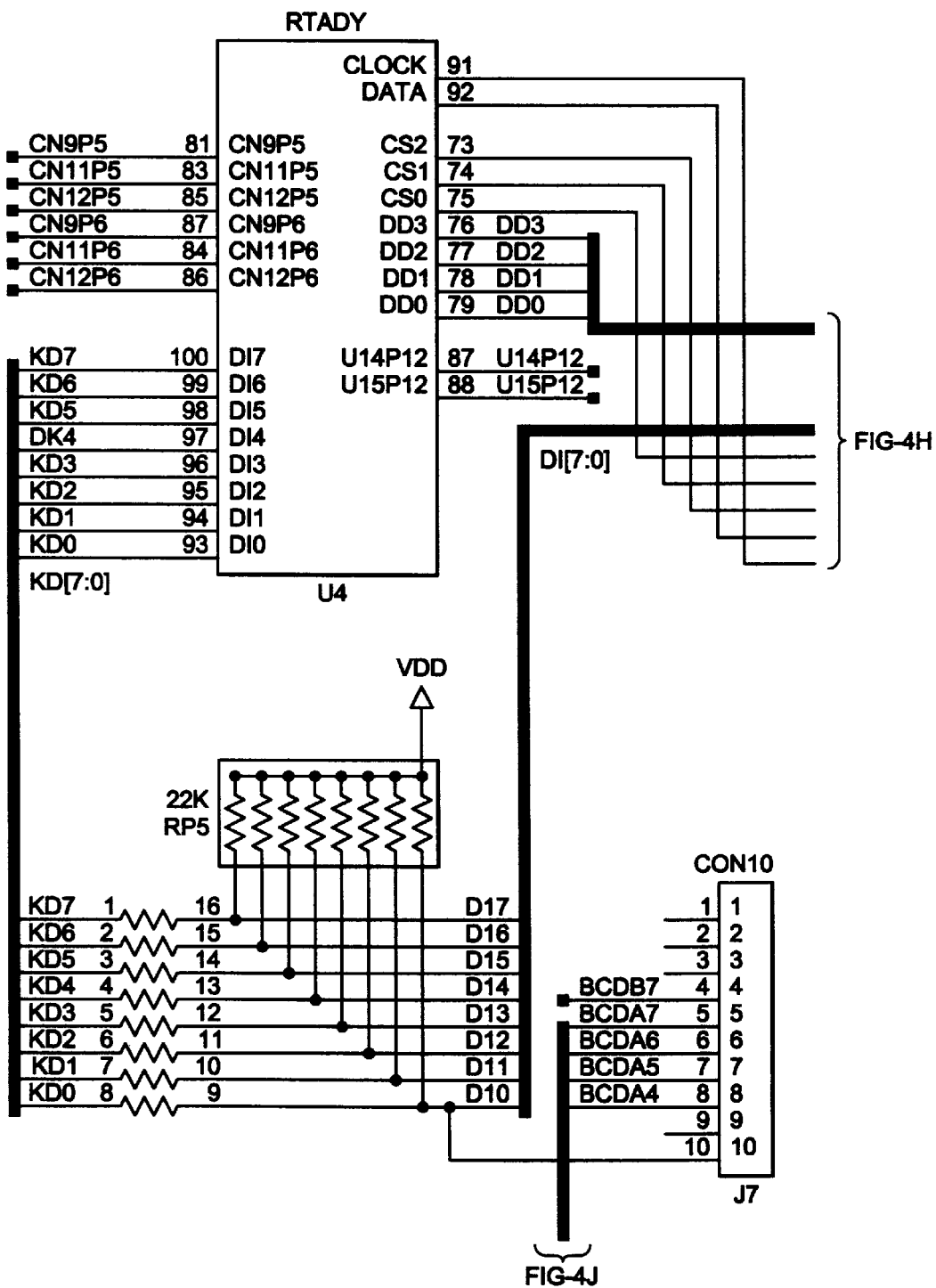
Figure 4I:
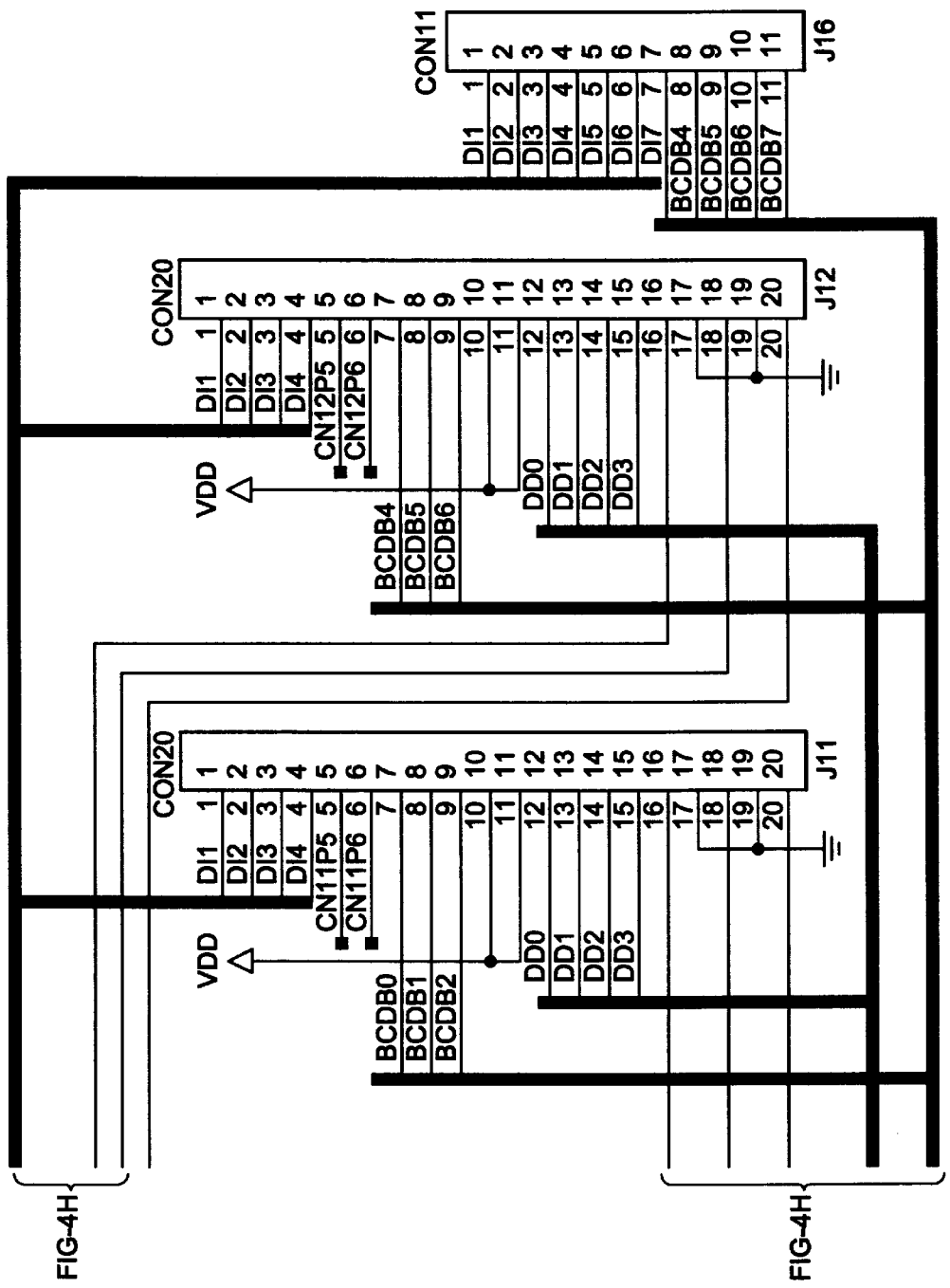
Figure 4J:
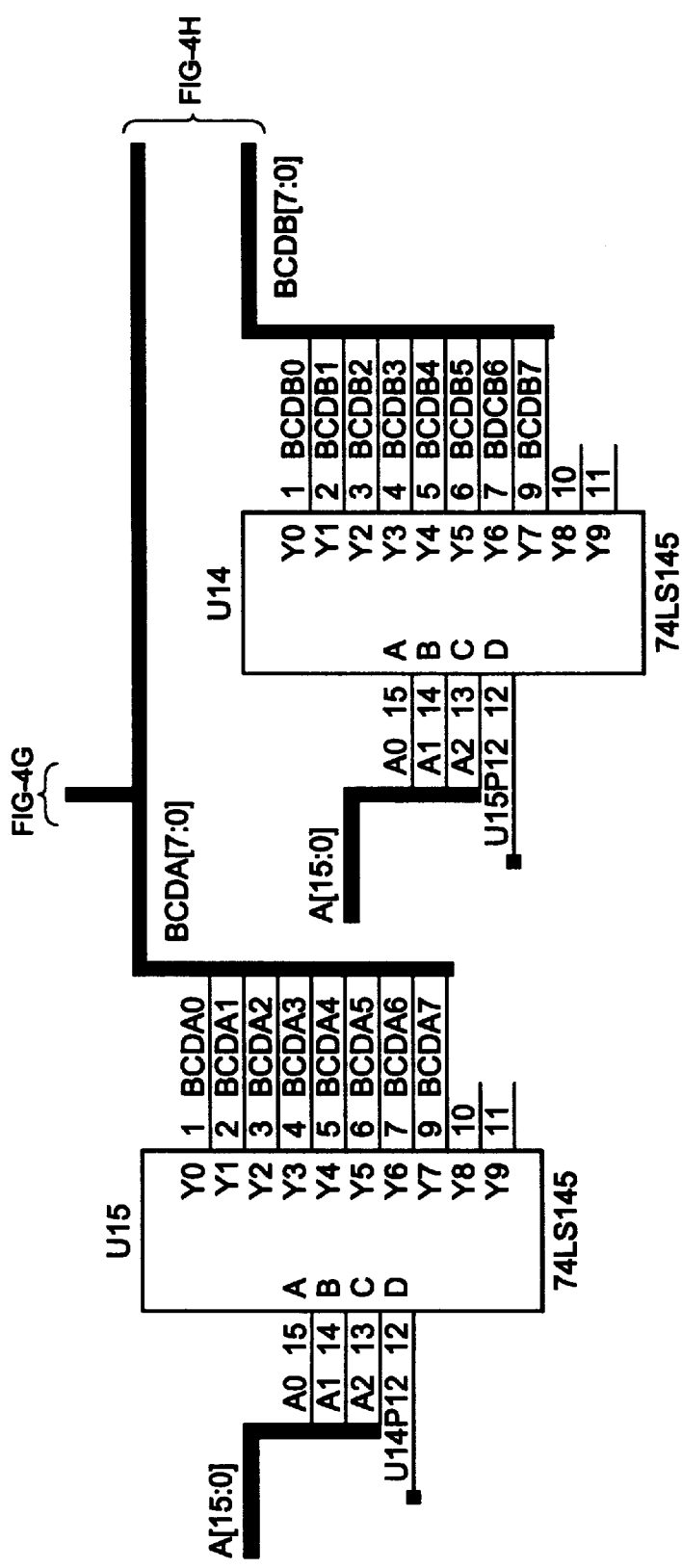
Figure 4K:
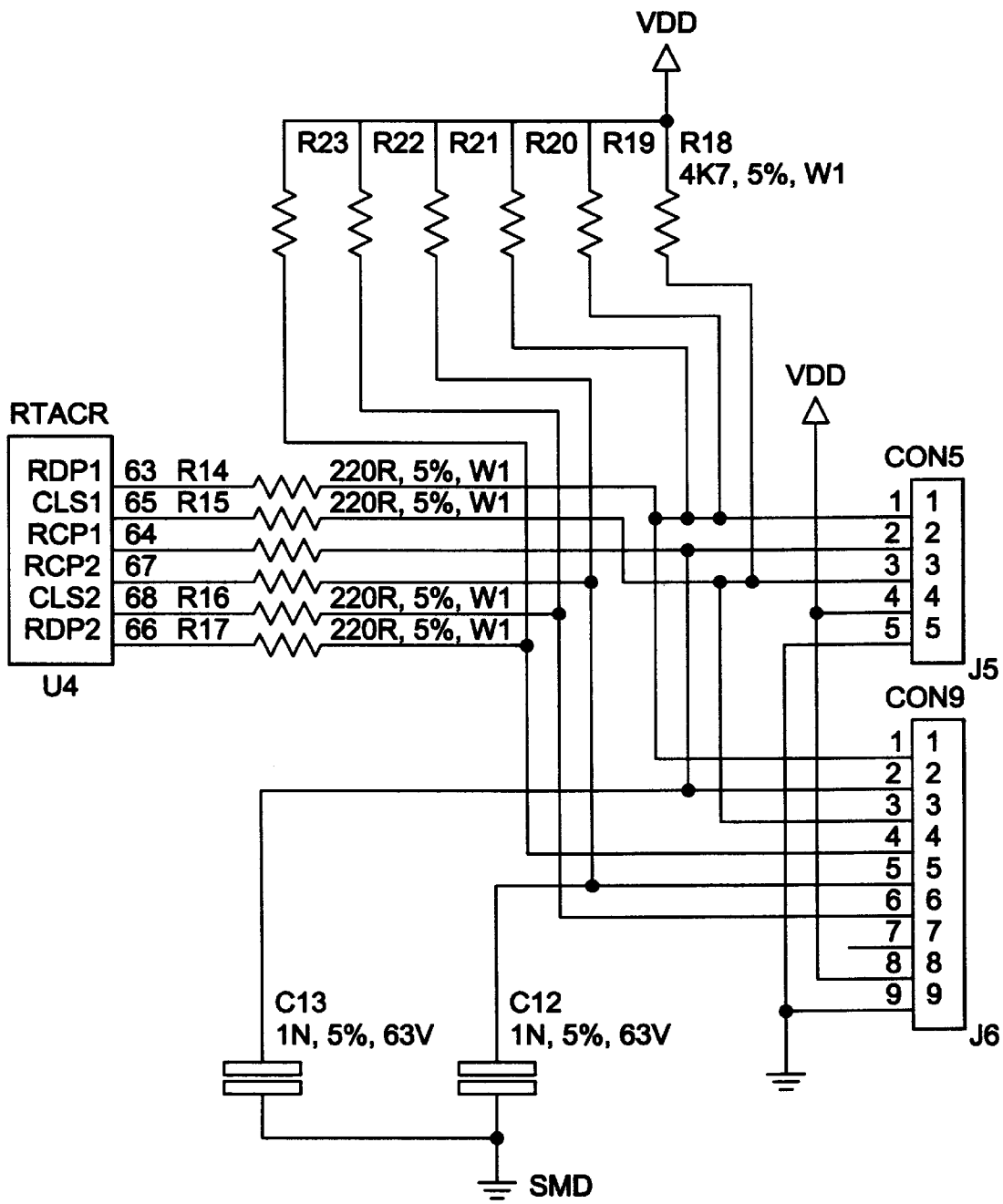
Figure 4L:
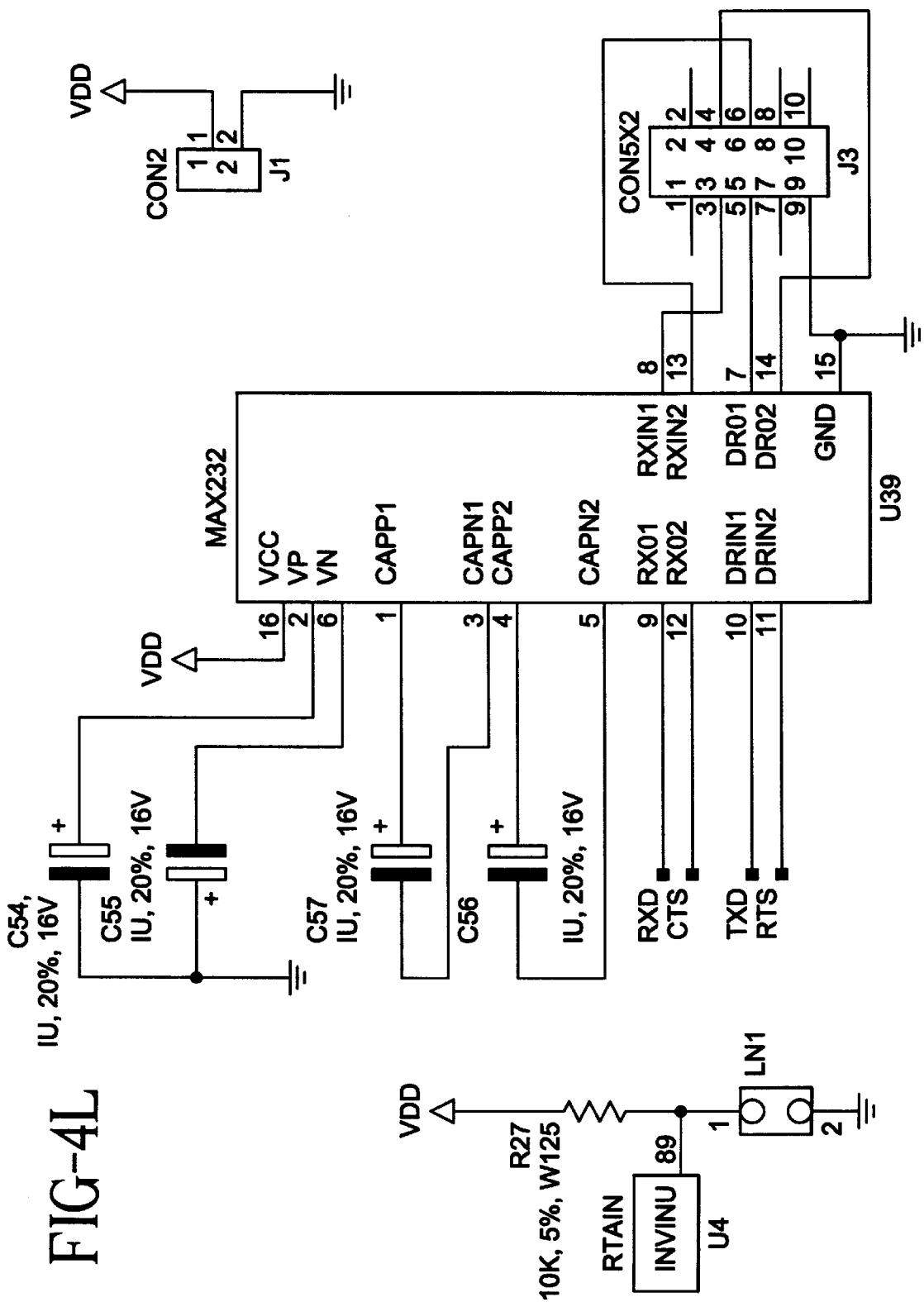
Figure 4M:
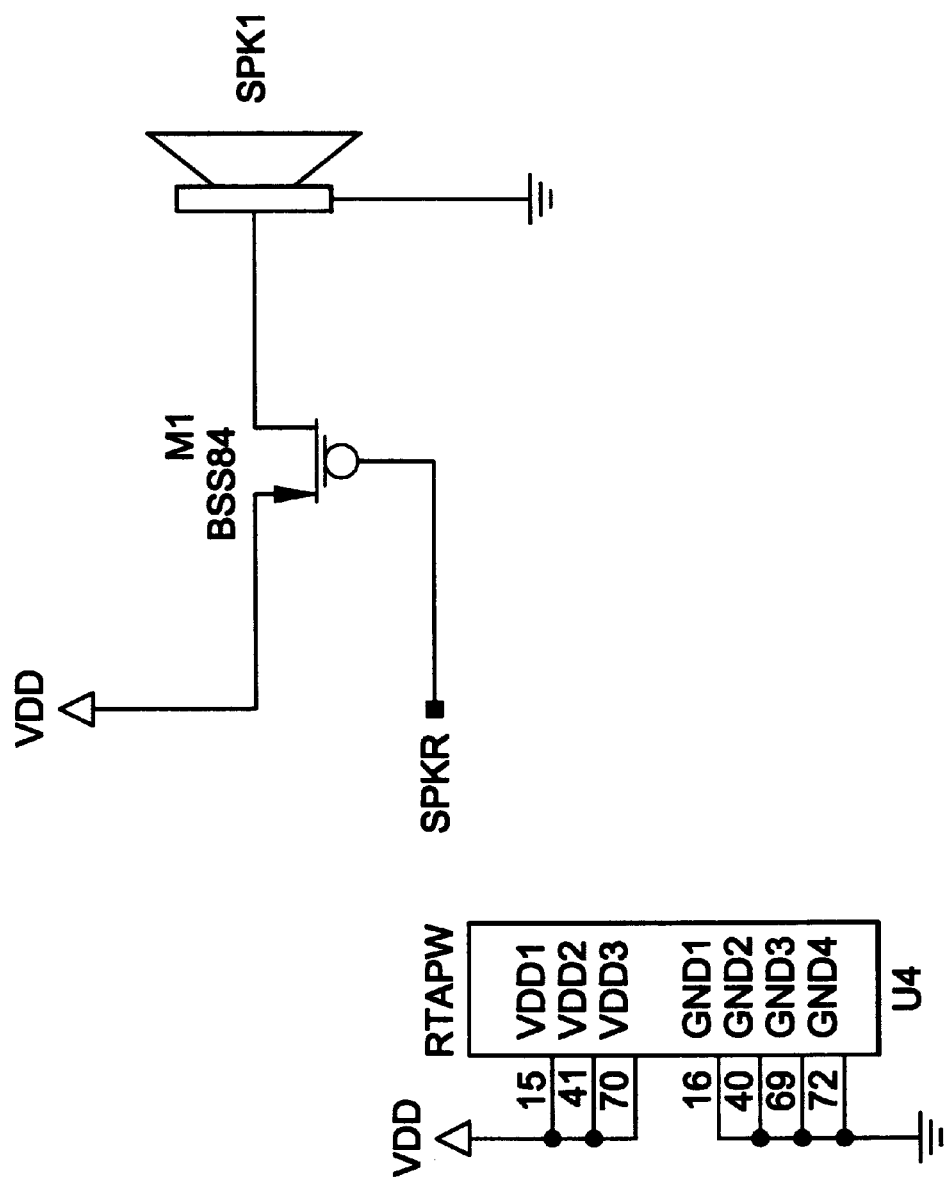
Figure 4N:
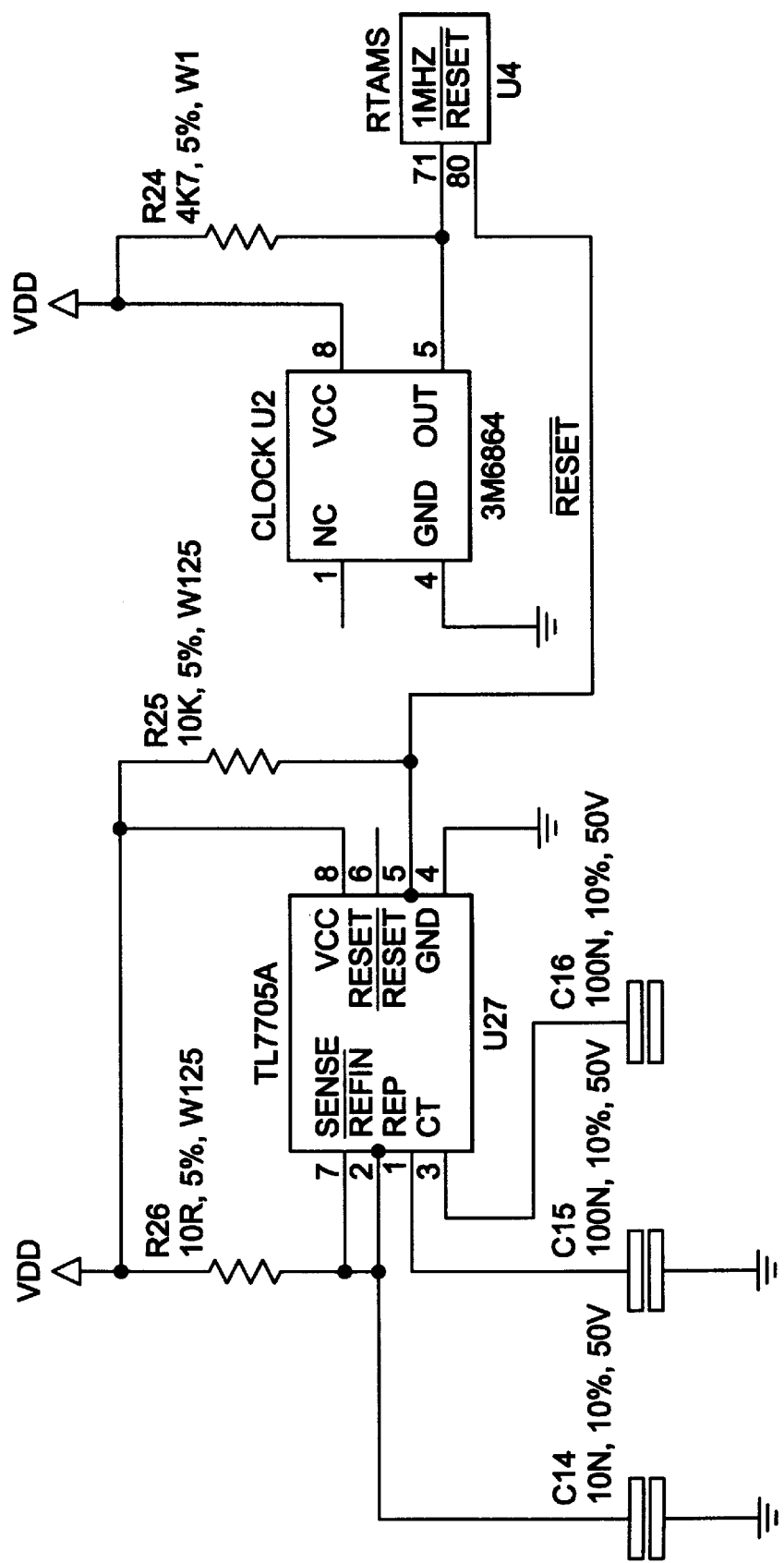

The preferred embodiment of interface circuit is shown in FIGS. 4a to 4n. This circuit is based around a CPU U1(80C32) and an Application Specific Integrated Circuit (ASIC) U4 which is designed to perform many of the functions assigned to individual circuits in the previous embodiments.

The parallel port of the PC is initialised substantially as before and is connected to the interface circuit via a cable to the 25-way connector block J2. The pins of the connector J2 are assigned differently in the initialisation procedure but the same signal lines are required, for example, a reset line RST, data lines PD0–PD7, CPU data acknowledge line ACK and various latch lines. These lines are connected to a first portion RTAPP of the ASIC U4, shown in FIG. 4a. Details of the address bus A[15:0] and data bus DC[7:0] routing between the ASIC U4 and the CPU U1 are shown in FIG. 4d to 4f. The second portion RTARM of the ASIC provides connection for the address and data buses A[15:0], DC[7:0] and signal lines RDPSEN, RAMCS1, RAMSC2 to memory circuits U31,U32. The third portion RTA80 of the ASIC U4 provides further connections to the CPU U1 and the memory circuits U31,U3 and also provides interrupt signal lines INT0, INT1, reset lines RESET and the ALE signal line. The LCD keyswitch control circuit is shown in FIG. 4c. Keyswitch matrix connectors J7,J8,J10,J16 are selected from the address bus A[15:0] through latches U15,U16 (74LS145) via select address buses BCDA[7:0], BCDB [7:0], and read along a data bus DI [7:0]. Address selection for the LCD matrix connectors J9,J11,J12 is also from the address bus A[15:0] through the latch ICs U15,U14 via the select address buses BCDA[7:0], BCDB [7:0]. Data buses DI[7:0], DD[3:0] also connect the LCD matrix connectors. Enabling of the address select latch ICs U15, U14 and provision of the common connector data bus DI[7:0] is facilitated by the fourth portion RTADY of the ASIC U4 as show in FIGS. 4g to 4j. FIGS. 4k to 4n illustrates miscellaneous additional circuitry for the interface and further portions RTACR, RTAIN, RTAPW, RTAMS of the ASIC U4. The first and second circuit comprises a card reader interface which connects to a card reader via connectors J3, JS, J6. Card reader signals are read into the ASIC U4 and to the CPU via a further card reader interfacing circuit U39 (MAX 232). A switching circuit centred about a TL7705A IC U27 provides a reset pulse signal to the ASIC.

Each of the embodiments of interface circuit detailed above is arranged to interface at least one relegendable LCD keyswitch to a computer port, and specifically to interface at least one matrix of relegendable LCD keyswitches, optionally in conjunction with standard keyswitches or other standard input and/or output devices, to a computer port. Each circuit comprises circuitry to address the or each keyswitch, to transfer data to the or each LCD keyswitch and to read data from the or each keyswitch or other standard input and/or output device. A LCD keyswitch in such an interface circuit is individually addressable and accessible to data so that an image representative of the data, command or function to be inputted by a keystroke is presented on the LCD screen of the keyswitch. Thus, if an alpha-numerical image is presented, when the LCD keyswitch is pressed or activated the letter or number represented is accepted for processing by the computer as either a text input or a selected entry as determined by the software running on the computer at the time. Images representative of a function can also be displayed when the LCD keyswitch is accorded that function.

The interface circuit is programmable so that each LCD keyswitch can be accorded a plurality of functions dependant on the software running on the computer. For example, if the interface circuit arrangement is adapted for use as a point-of-sale device in a restaurant, one keyswitch may be used for a different selection for each course in a meal and the corresponding price of each course selection would be entered into a summing program on the computer for presentation on a customer receipt or for inventory control.

An advantage of having sufficient on-board RAM in the interface circuit is that when a program is loaded on the computer, all command, function and symbolic images can be transferred to the interface circuit RAM for swift access and easy refreshing of the LCD keyswitch screens. ROM or programmable ROM (PROM) is used to hold initialisation commands and start-up data for initialising the interface circuit and for storing symbols used for initial keyswitch functions.

In all of the interface circuit embodiments described hereinabove, the circuit is in communication with a computer, such as a PC via a 25-way connector block. In certain circumstances, for example where the applications of a device incorporating the interface circuit are limited, the interface circuit is provided with an on-board microprocessor. The microprocessor (not shown) is programmable to effect all functions normally assigned to the computer. It will be understood of course that a connector block for communicating with a computer remains a desireable feature and that, by utilising the processing power normally associated with a microprocessor, a device incorporating such an arrangement is connectable to a network, for example, a local area network (LAN) and can utilise all the facilities provided by the network. These facilities can include workstations, printers, modems and a host of other peripheral devices. The microprocessor is optionally pre-programed for the specific applications which the interface circuit is to perform but in a preferred arrangement the microprocessor is programmable in situ via the network, by connecting to a computer or by reading program instructions from a disc drive fitted to the device. An extremely efficient and fast programmable, relegendable LCD keyswitch device is realisable where the interface circuit CPU is controlled by an on-bard microprocessor.

It will be seen that the interface circuits detailed above may be refined for specific data input and user feedback tasks. For example, a 4×3 matrix relegendable LCD keyswitches may be arranged in a row forming a keystrip which can be adapted to interact with any computer software or on-board firmware which demands the use of function keys or utilizes a series of complex keystrokes to perform a specific function. Thus, by utilising such a keystrip which may be attached to a standard PC keyboard, a user may define a softkey or macro which can be indicated symbolically on the LCD keyswitch. Each LCD keyswitch may be programed to display option buttons normally represented within a graphical user interface (GUI) environment. By using a TSR or driver program or by integrating the keyswitch program into the GUI program, each LCD can be refreshed for each new menu or button. With a high resolution LCD keyswitch screen, pictograms and icons may be represented. The keystrip is fixable to the front, rear or side of a standard keyboard or is provided with a base so it can stand alone.

Figure 5A:
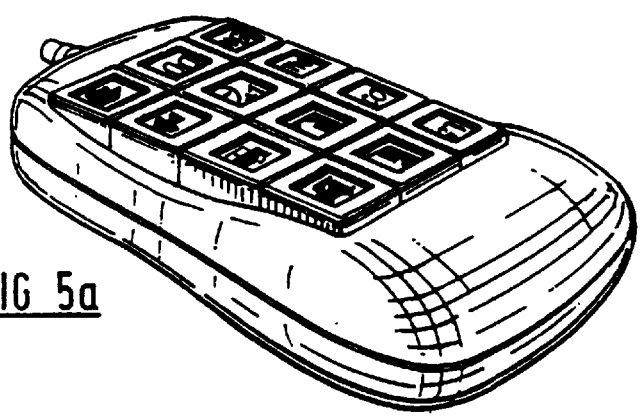
FIGS. 5a to 5c are a perspective view, a plan view and a side elevation of a hand held relegendable LCD keypad, respectively.
Figure 5B:
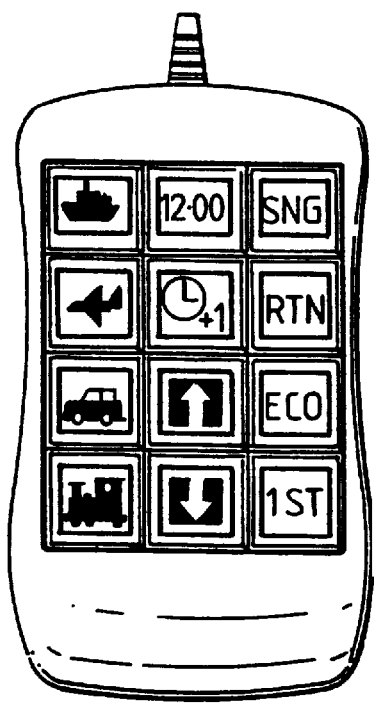
Figure 5C:
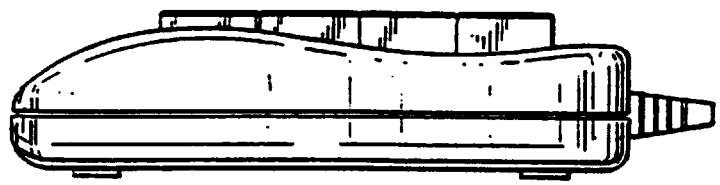

FIGS. 5a to 5c illustrate a data input device comprising a 4×3 matrix of relegendable LCD keyswitches in the form of a keypad. The LCD keypad is adapted to interact with software either by designing the software to communicate with the associated interface or by a TSR or driver program as described above. This data input device is adaptable to form a combined data input device and pointer device by incorporating a standard ball and variable resistor arrangement. A further pointer device of this type combines a 4×3 matrix of LCD keyswitches with a thumb or finger actuated trackball (not illustrated).

The data input devices of the type described can be put to a wide range of uses related to data input and visual feedback to the user. The keypad and pointer devices are programmable to interact with menu driven programs having large numbers of available on-screen options. The most popular options within each menu are selected for (representative) display on the LCD keyswitch. For example, a travel agency uses a computer program to assist customer selection of a preferred travel route and transport means. A first menu displays options relating to mode of travel, a sub-menu on selection of the first option relates to available destinations by that mode of travel, etc. If a customer wishes to take a flight from London to a particular destination, the options of flight times and airport available are represented on the LCD keyswitches (as illustrated), the customer or travel agent presses the chosen time or airport to view other options or to book the flight, as appropriate.

Each of the above devices comprises an array of twelve LCD keyswitches which is connectable to one LCD screen interface and one keyswitch (membrane) interface on the interface circuit. The interface circuit described above have at least two interface connectors of each type. For pointer device, the trackball function must also be routed through the interface circuit. For hand-held devices or where space is at a premium the interface circuit can be housed internally in the PC connection to the parallel port.

Figure 6:
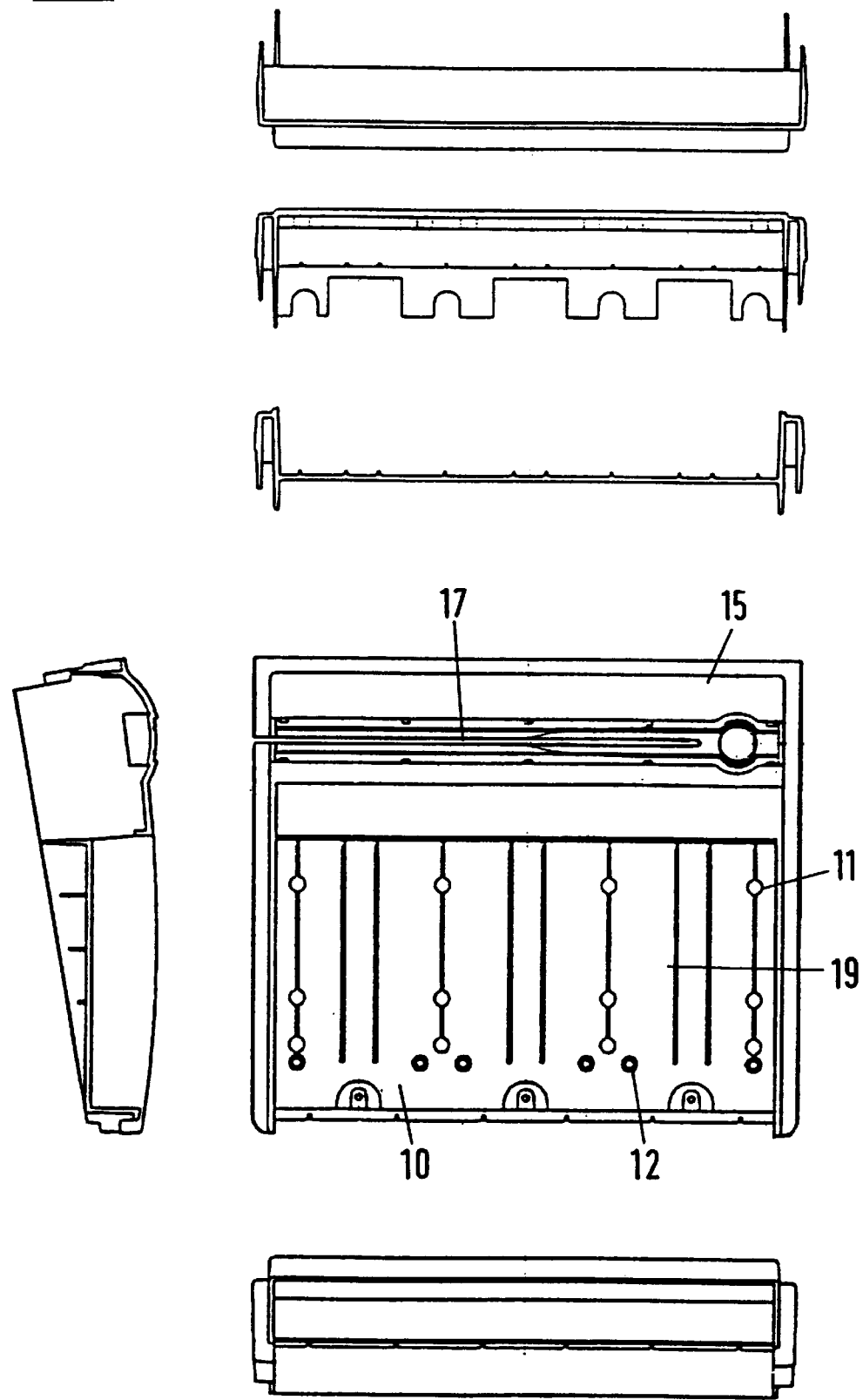
FIGS. 6 and 6a are a plurality of elevations and sectional elevations of a modular housing for a point-of-sale device.
Figure 6A:
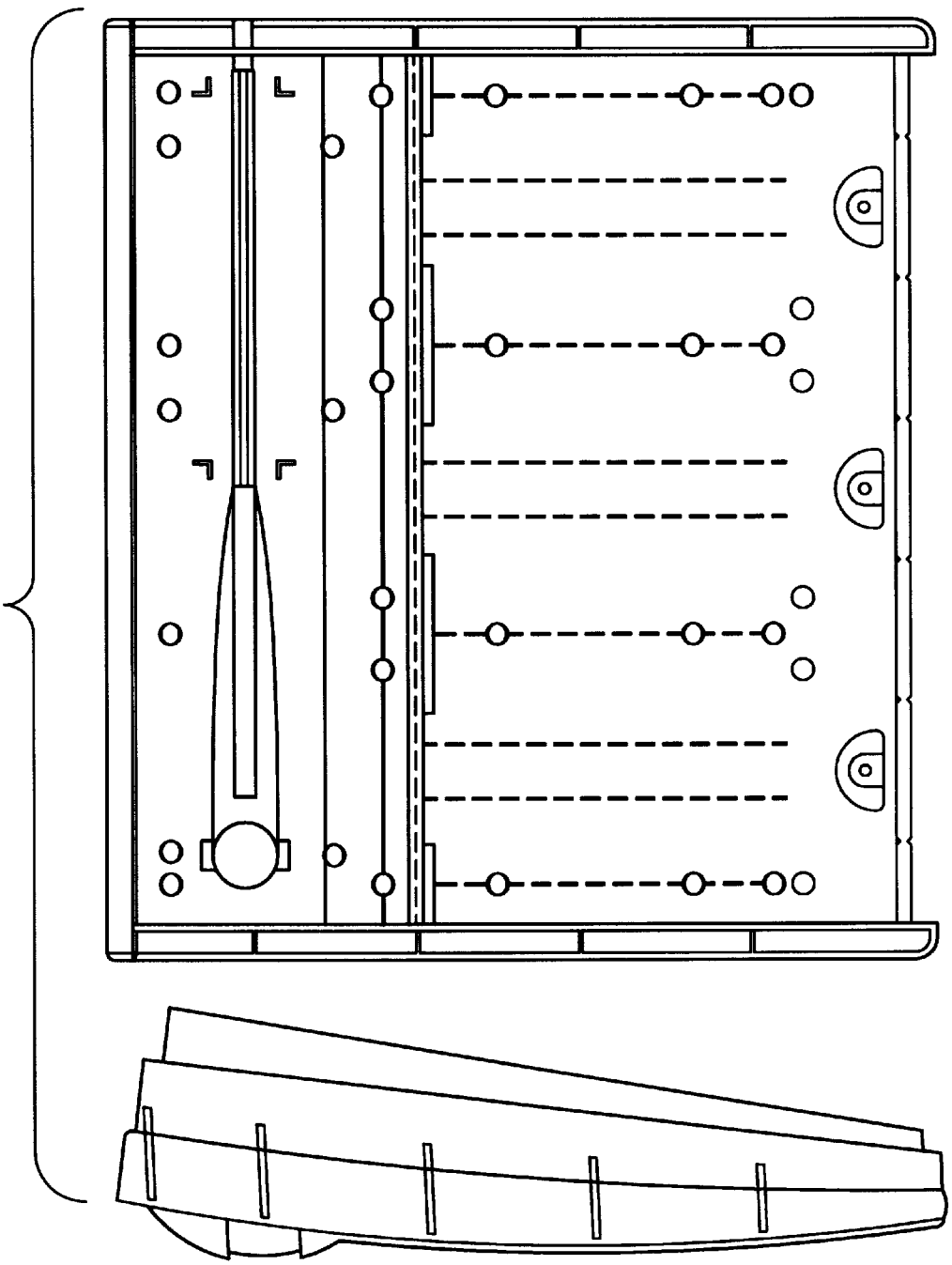
Figure 7:
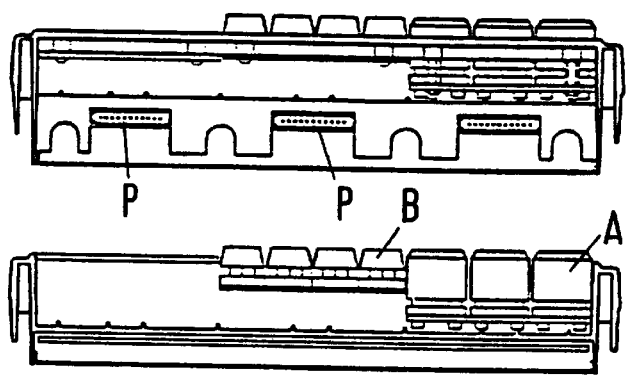
Figure 7:
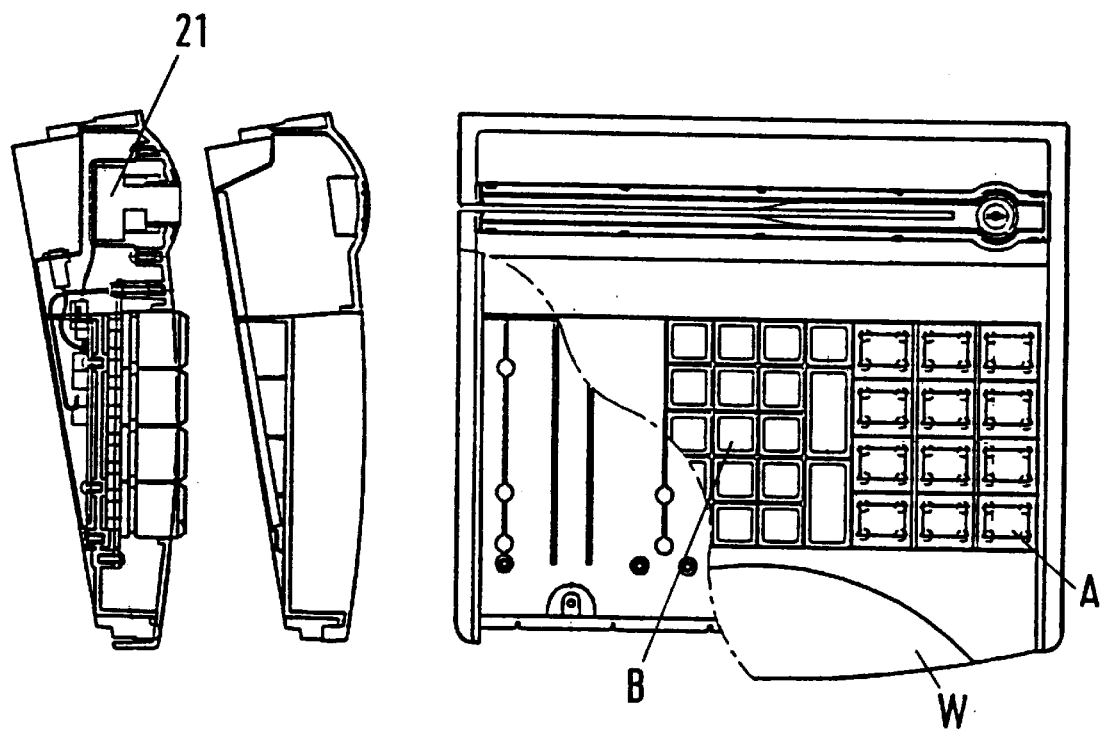
Figure 7:
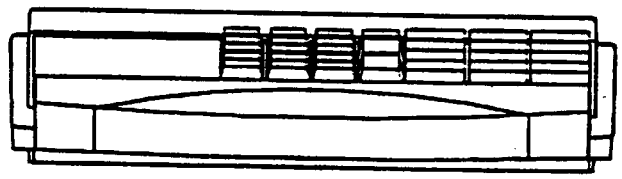

Referring now to FIGS. 6, 6a and 7, a modular housing for a point-of-sale device, having the interface circuit of the invention, is illustrated in various sections and elevations. The housing comprises a base plate portion 10 having pillars 11 and receivers 12 for engaging LCD keyswitch modules, blanking plates and other modules. An upper plate portion 15 has a card swipe slot 17 for accepting magnetic strip cards and a large aperture 19 to accommodate the keyswitch matrices or blanking plates. A card reader 21 is provided at one end of the card swipe slot and the output of the card reader is read by the interface circuit. A 4×3 matrix of relegendable LCD keyswitches or a 5×4 matrix of standard keyswitches 13 are interchangably accommodated within one area of the aperture. Up to three matrices may be accommodated in said aperture. Each matrix is mounted on its respective PCB which is linked to the adjacent interface circuit. The interface circuit is in turn linked to the parallel port of a PC via a socket connector mounted at the rear of the device. The interface circuit has the capability of running three serial ports P or Universal Asynchronous Receiver/Transmitter (UART) circuits for driving a printer, a cash drawer or further devices. A shaped wrist-pad W is provided in front of the keyswitch matrices for user comfort and to attempt to alleviate the incidence of repetitive strain injury (RSI). A lock is also provided to prevent unauthorised use.

Figure 8A:
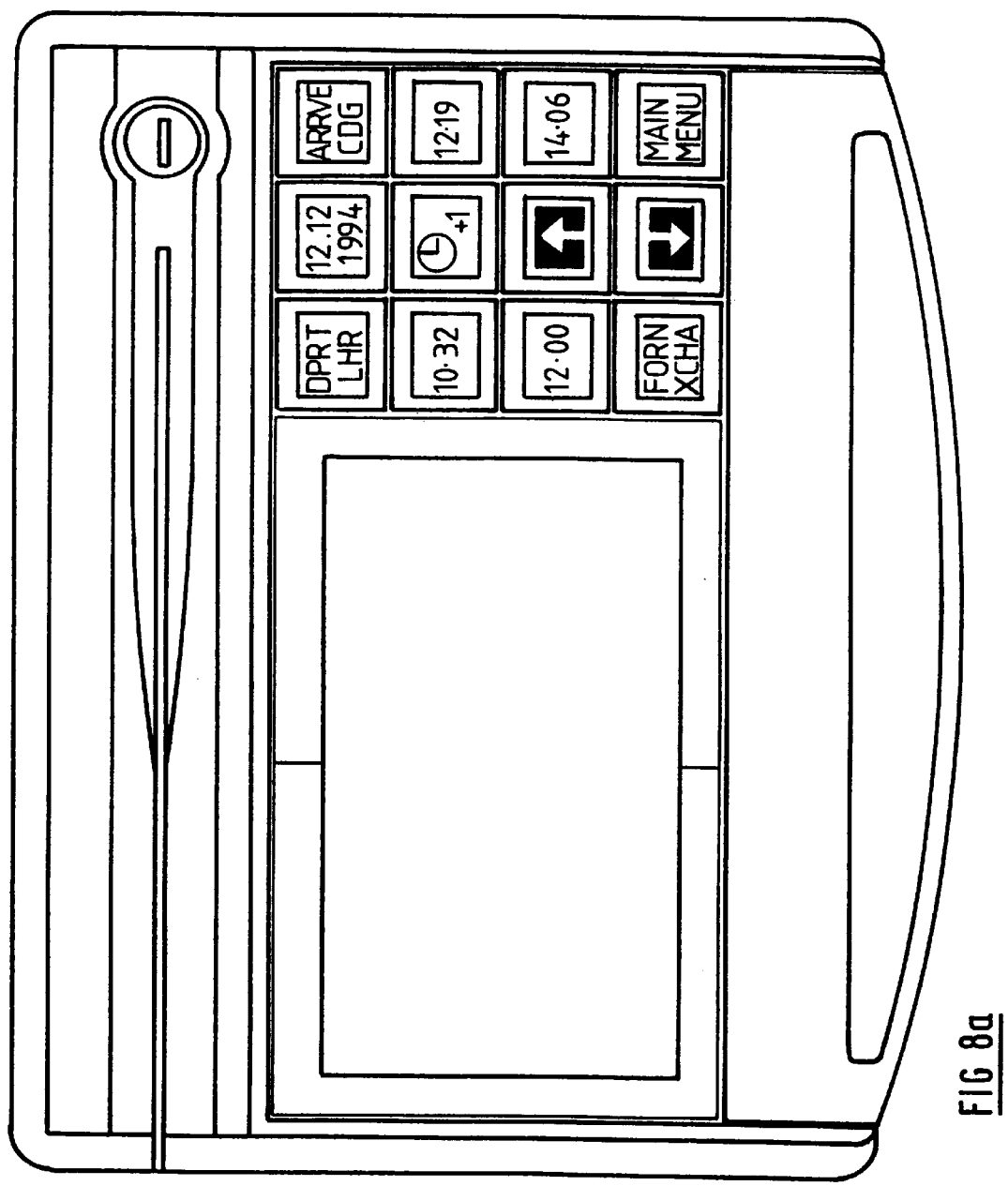
FIGS. 8a and 8b are plan views of a first and second embodiment of point-of-sale device having a 4×3 keypad matrix of relegendable LCD keyswitches.
Figure 8B:
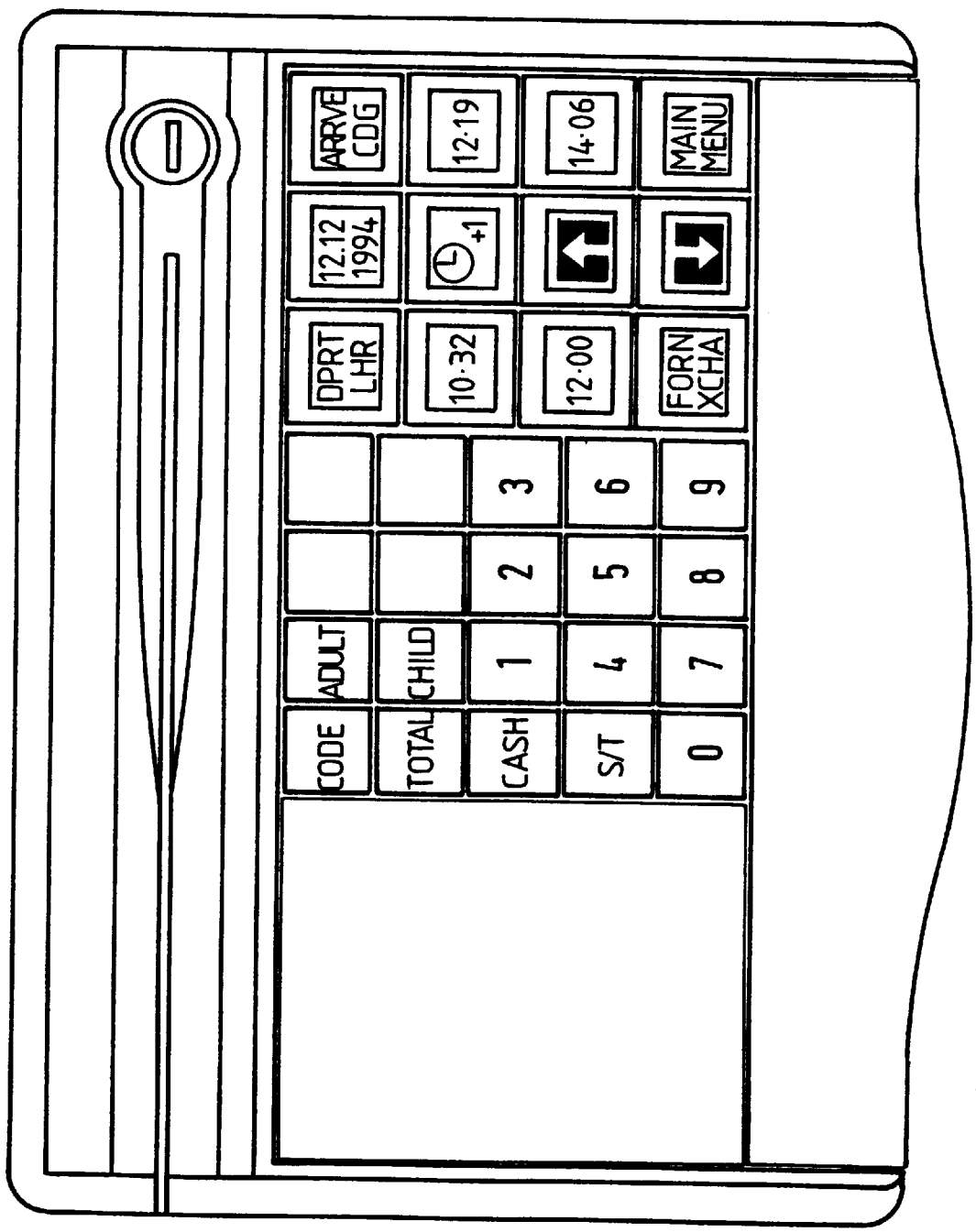

FIGS. 8a and 8b illustrate point-of-sale devices having a single 4×3 matrix of relegendable LCD keyswitches. In the first embodiment (FIG. 8a), the two additional areas are occupied by a pair of blanking plates and a note pad is provided. The second embodiment (FIG. 8b) has only one blanking plate and the central matrix aperture is occupied by a 5×4 matrix of standard non-relegendable keyswitches.

It will be appreciated that further arrangements of these embodiments can be realised by inserting a second matrix of LCD keyswitches or standard keyswitches in the blanked out area. Other facilitates may also be provided such as a small receipt printer.

A yet further arrangement of the first embodiment of point-of-sale device having a single matrix of LCD keyswitches includes a LCD screen for displaying important information such as stolen card numbers, for example. As with the other features of the point-of-sale devices, the screen is a modular plug-in device which is programmable via the PC or has program instructions pre-programed into the interface circuit memory. A modem circuit can be used for communication with banking services to keep stolen credit card numbers and data such as foreign exchange rates up to date.

Figure 9A:
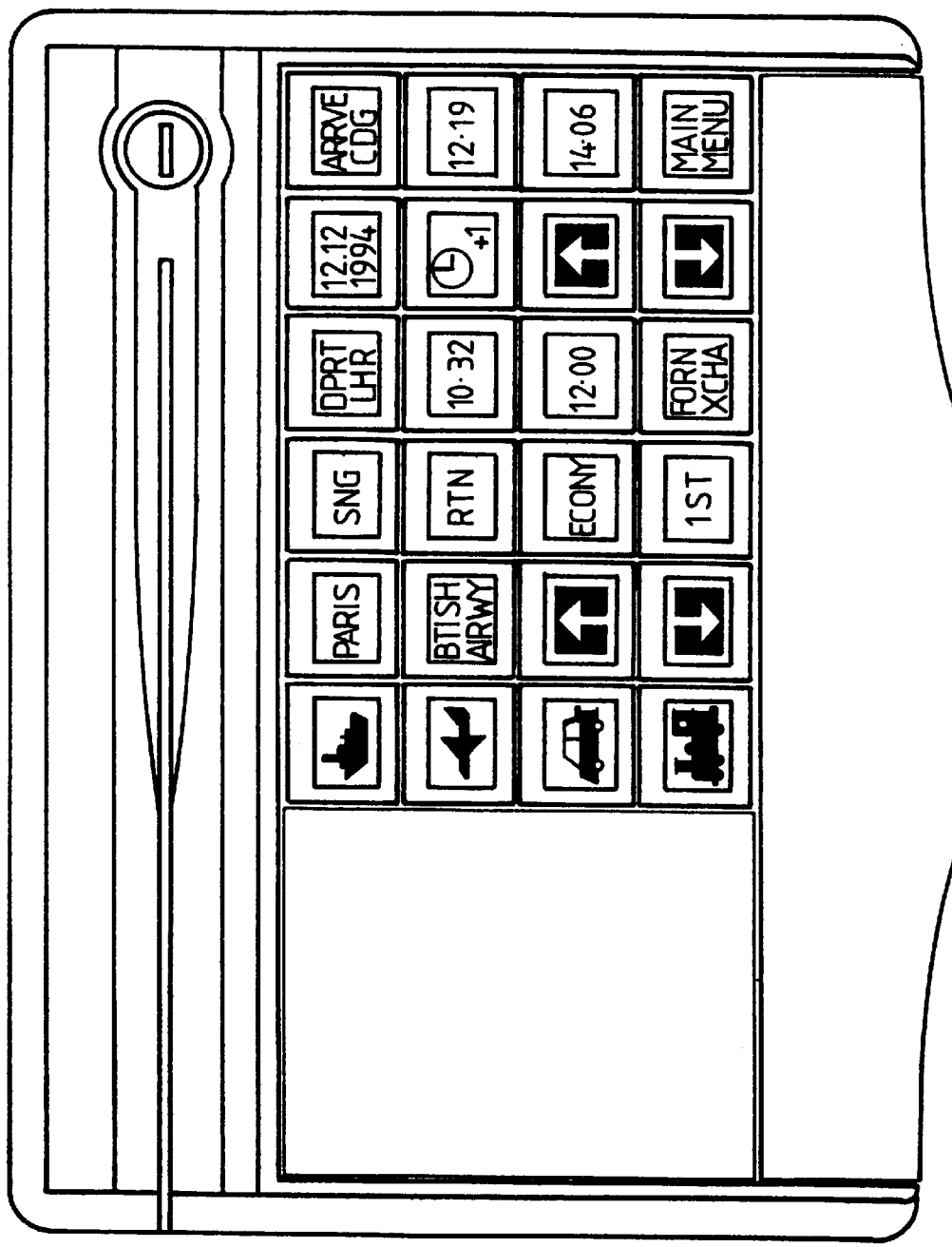
FIGS. 9a and 9b are plan views of a third and fourth embodiment of point-of-sale device having two 4×3 keypad matrices of relegendable LCD keyswitches.
Figure 9B:
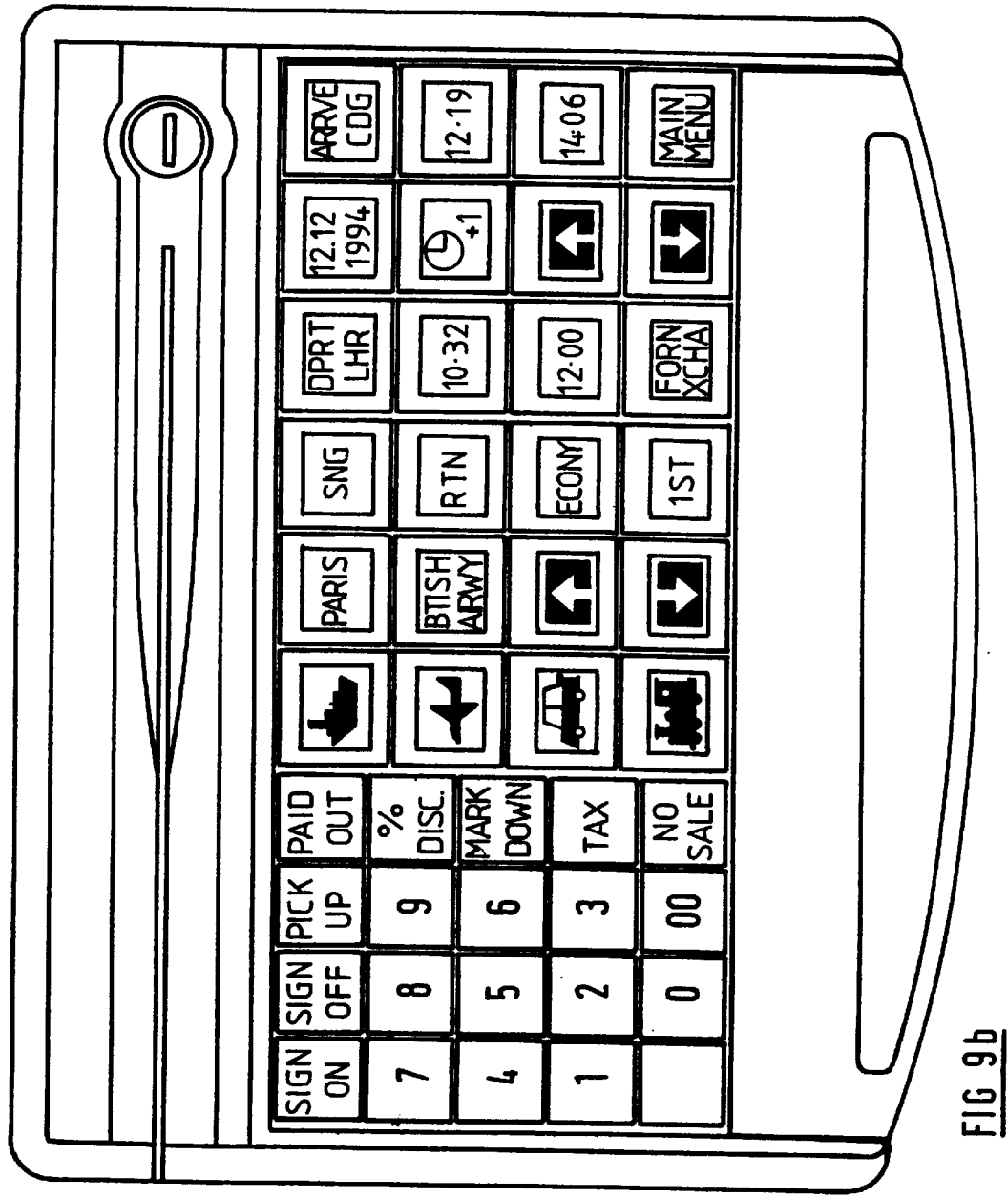

The third and fourth embodiments of point-of-sale device, as shown in FIGS. 9a and 9b, respectively, each comprise two 4×3 relegendable LCD keyswitch matrices. The third embodiment has a blanking plate which can be used to support a notepad or can be substituted by a further LCD keyswitch matrix, a receipt printer or a small LCD screen for displaying relevant data. The fourth embodiment includes a standard 5×4 keyswitch matrix.

In each of the above embodiments of point-of-sale device the wrist-pads are interchangeable and may be provided with a thumb receiving groove or a coin receptacle.

The point-of-sale devices as described function substantially identically as the data input devices described hereinbefore and are adapted to interface with programs running on the computer to which they are connected. Thus, point-of-sale data is selectively presentable on the LCD keyswitches for data input or for command or function execution and for consumer/user assistance. Details of individual transactions and all transactions within a predetermined period are thus available to inventory control programs running on the computer. The point-of-sales devices detailed above are particularly suitable for stand-alone operation by incorporating a microprocessor to control the interface circuit CPU and the optional network and UART circuits.

The on-board facilities provided by the interface circuits allow for complex self-testing routines to be effected on each LCD keyswitch. For example, individual horizontal and vertical lines of pixels are illuminated individually or individual pixels are illuminated randomly or sequentially for testing. Scrolling and flashing of the LCD screen images is also facilitated by the fast refreshing of the LCD keyswitch screens.

It will of course be understood that the invention is not limited to the specific details described herein, which are given by way of example only, and that various modifications and alterations are possible within the scope of the invention as defined in the appended claims.

What is claimed is:

1. An interface circuit for interfacing a matrix of relegendable liquid crystal display (LCD) keyswitches to a controlling processor, the interface circuit comprising:

means for addressing each LCD keyswitch, the addressing means including a matrix address circuit;

means for transferring display data to each LCD keyswitch display, the data being representative of a desired function of the keyswitch;

means for reading data from each LCD keyswitch; and means for transferring data representative of a desired function of a keyswitch from the controlling processor to the interface circuit for display on the LCD keyswitch so that, when that keyswitch is activated, the keyswitch is read by the interface circuit which allows the controlling processor to execute the indicated function represented on the display of the LCD keyswitch;

wherein each LCD keyswitch is individually addressable using the matrix address circuit and separately relegendable by the interface circuit so that high speed, on-line interaction between each LCD keyswitch and the controlling processor is facilitated for substantially immediate relegending or refreshing of the display on each LCD keyswitch.

2. An interface circuit as defined in claim 1, in which the circuit further comprises:

means for establishing the current function of each keyswitch within a matrix;

means for transmitting data to the relegendable LCD to display an alpha-numerical, graphical or pictogram image representative of the current or desired keyswitch function; and means for providing a signal to the controlling processor to enact the function represented on the LCD keyswitch when the keyswitch is activated.

3. An interface circuit as defined in claim 1, in which the circuit further comprises:

means for displaying on each LCD keyswitch an image representative of the data to be introduced or command to be executed;

means for selecting or enabling each keyswitch;

means for reading or sensing when each keyswitch is activated;

means for transmitting the data or command to the controlling processor; and means for individually and separately altering the representative image on the display and the data to be introduced or command to be executed by a LCD keyswitch when the keyswitch is activated.

4. An interface circuit as defined in claim 1, in which at least one LCD keyswitch within the matrix is assigned a macro comprising a plurality of functions executable by a single keystroke of the keyswitch.

5. An interface circuit as defined in claim 1, in which the circuit further comprises memory circuits for holding default instructions or initialization commands and start-up data and for storing program instructions and/or data representative of the images for display on each LCD keyswitch.

6. An interface circuit as defined in claim 5, in which Read Only Memory (ROM) is provided on the circuit to hold default instructions or initialization commands for the LCD keyswitches and in which Random Access Memory (RAM) is provided on the circuit for storing data representative of the images used for a particular application or program operating on the controlling processor.

7. An interface circuit as defined in claim 6, in which the RAM is preloaded with application or program instructions so that a central processor unit (CPU) in the interface circuit is independent of the controlling processor.

8. An interface circuit as defined in claim 1, in which the controlling processor includes a computer in communication with the interface circuit via the parallel port of the computer.

9. An interface circuit as defined in claim 1, in which the controlling processor includes an on-board microprocessor in direct communication with an interface circuit CPU.

10. A data input device comprising a matrix of relegendable LCD keyswitches and an interface circuit for interfacing the device with a controlling processor, the interface circuit including a matrix address circuit, the keyswitches comprising LCDs for displaying an image representative of the keyswitch function wherein each keyswitch in the matrix is individually addressable using the matrix address circuit and separately relegendable by the interface circuit so that high speed, on-line interaction between each LCD keyswitch and the controlling processor is facilitated for substantially immediately relegending or refreshing of the display on the LCD keyswitch.

11. A data input device as defined in claim 10, in which the interface circuit includes a driver circuit having memory circuits to store data representative of the image displayed and includes a refresh function to retain the image on the display until a reset signal or new data is received.

12. A data input device as defined in claim 10, in which each keyswitch is assigned a specific function changeable on operation of any one keyswitch.

13. A data input device as defined in claim 10, in which the data input device further comprises either a keyboard, a keypad or a keystrip.

14. A data input device as defined in claim 10, in which the data input device further comprises a pointer device.

15. A data input device as defined in claim 10, adapted for logging data received remotely wherein the data to be logged is displayed on the LCD keyswitch and said data is entered to memory by activating said keyswitch to confirm data entry.

16. A data input device as defined in claim 10, adapted to interact with software running on the controlling processor so that imbedded instructions or functions within the software are represented by images on the LCD keyswitches and are implemented by activating said keyswitches.

17. A data input device as defined in claim 10, in which visual cues normally displayed on a computer visual display unit (VDU) are displayed or symbolically represented on the LCD keyswitches.

18. A data input device as defined in claim 10, incorporating a user help system in which commands or instruction cues are displayed or symbolically represented on the LCD keyswitches.

19. A data input device as defined in claim 17, in which the cues are concurrently displayed on the VDU.

20. A data input device as defined in claim 18, in which the cues are concurrently displayed on the VDU.

21. A data input device as defined in claim 10, for use in conjunction with a computer running a graphical user interface (GUI) environment in which option button icons are displayed on the LCD keyswitches.

22. A point-of-sale device comprising a matrix of relegendable LCD keyswitches and an interface circuit for interfacing the device with a controlling processor wherein point-of-sale data is selectively representable on each LCD keyswitch such that when a keyswitch is activated the data represented thereon is entered as part of a transaction, the interface circuit including a matrix address circuit each LCD keyswitch being individually addressable using the matrix address circuit and separately relegendable by the interface circuit so that high speed, on-line interaction between each LCD keyswitch and the controlling processor is facilitated for substantially immediate relegending or refreshing of the display of the LCD keyswitch.

23. A point-of-sale device as defined in claim 22, in which the data presented on the LCD keyswitches is representative of a point-of-sale function.

24. A point-of-sale device as defined in claim 22, in which the data presented on the LCD keyswitch is representative of a parameter relating to a sale item in a transaction.

25. A point-of-sale device as defined in claim 22, which includes a card reader and a card reader interface in communication with the interface circuit wherein data read from a card is used in the transaction.

26. A point-of-sale device as defined in claim 25, in which data read from a card is displayed on a screen so that security details may be checked or compared.

27. A point-of-sale device as defined in claim 22, having at least two input/output (I/O) ports, the first port comprising a communication link between the point-of-sale device and a computer and the second port comprising a communication link to a peripheral device in which the communication link comprises a network.

28. A point-of-sale device as defined in claim 27, in which the peripheral device is selected from a modem, a cash drawer driver, a printer, a computer or a second point-of-sale device.

29. A point-of-sale device as defined in claim 27, in which the second and subsequent I/O ports are provided with Universal Asynchronous Receiver/Transmitter (UART) circuits for data transfer.

30. A point-of-sale device as defined in claim 22, having a housing to facilitate the interchangeability of matrices of relegendable LCD keyswitches or standard switches, LCD screens, printing devices, magnetic strip card readers and I/O port driver circuits.

31. A point-of-sale device as defined in claim 22, which includes a housing, the housing comprising an upper plate and a lower plate, the upper plate having a first aperture for receiving a card swipe guide and a second aperture for receiving a one or more LCD keyswitch (matrix) modules forming the functional part of the device and the lower plate having means for receiving circuit boards and receivers for holding the upper plate in snap engagement.

32. A point-of-sale device as defined in claim 31, which includes apertures for I/O parts of which a primary port facilitates the connection of the device to a computer and the secondary and subsequent ports facilitates the connection of UART or driver circuits to peripheral devices.

* * * * *

UNITED STATES PATENT AND TRADEMARK OFFICE
CERTIFICATE OF CORRECTION

PATENT NO.   : 6,014,131
DATED        : January 11, 2000
INVENTOR(S)  : Barry, et al.

It is certified that error appears in the above-identified patent and that said Letters Patent is hereby corrected as shown below:

In Column 7, Line 9,   the patent now reads "FIGS. 1*a* a to 1*h*"

this should read --FIGS. 1*a* to 1*h*--.

In Column 11, starting on Line 27,   the patent now reads "programming;
The";
this should read --programming;
IRQ7
IRQ5
The--.

In Column 14, Line 58,   the patent now reads "SDCL5 (latched bits";

this should read --SDCL5 (latched bit5--.

Signed and Sealed this

Twelfth Day of December, 2000

Attest:

Q. TODD DICKINSON

*Attesting Officer*   *Director of Patents and Trademarks*